United States Patent
Fazeel et al.

(10) Patent No.: US 10,958,484 B1
(45) Date of Patent: Mar. 23, 2021

(54) TIME-BASED DECISION FEEDBACK EQUALIZER

(71) Applicant: Cadence Design Systems, Inc., San José, CA (US)

(72) Inventors: Hajee Mohammed Shuaeb Fazeel, Karnataka (IN); Raksha, Karnataka (IN); Thomas Evan Wilson, Laurel, MD (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 16/806,022

(22) Filed: Mar. 2, 2020

(51) Int. Cl.
*H04L 25/03* (2006.01)

(52) U.S. Cl.
CPC .............. *H04L 25/03057* (2013.01); *H04L 2025/03484* (2013.01)

(58) Field of Classification Search
CPC ............ H04L 25/03057; H04L 2025/03484
USPC ................................................ 375/229, 233
See application file for complete search history.

(56) References Cited

U.S. PATENT DOCUMENTS

| 8,867,598 B1 * | 10/2014 | Gagnon | ............ H04L 25/03031 375/229 |
| 10,826,730 B1 * | 11/2020 | Liu | .................. H04L 25/03949 |

* cited by examiner

*Primary Examiner* — Fitwi Y Hailegiorgis
(74) *Attorney, Agent, or Firm* — Tarolli, Sundheim, Covell & Tummino LLP

(57) ABSTRACT

In some examples, a time-based equalizer can be configured to receive an input signal from a channel. The input signal can be distorted by previously received input signals transmitted over the channel. The time-based equalizer can be configured to compensate for distortions in the input signal caused by at least one previously received input signal to provide an ISI compensated input signal. The time-based equalizer can be configured to compensate for the distortions by edge time shifting respective edges of the input signal in time over a time interval for detecting the input signal to new edge time locations based on a feedback signal and edge movement signals. The feedback signal can be generated based on at least one previously received input signal.

20 Claims, 11 Drawing Sheets

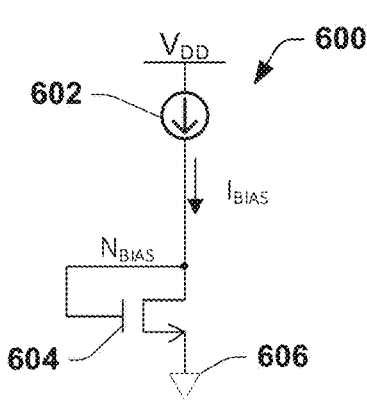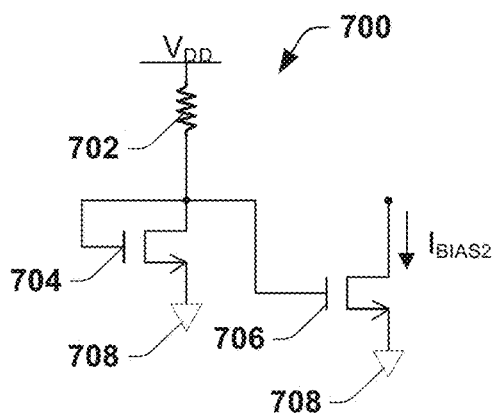
FIG. 6  FIG. 7
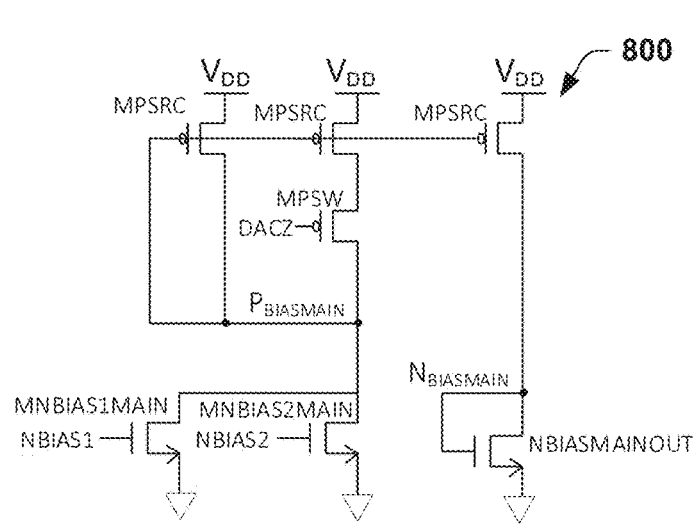
FIG. 8
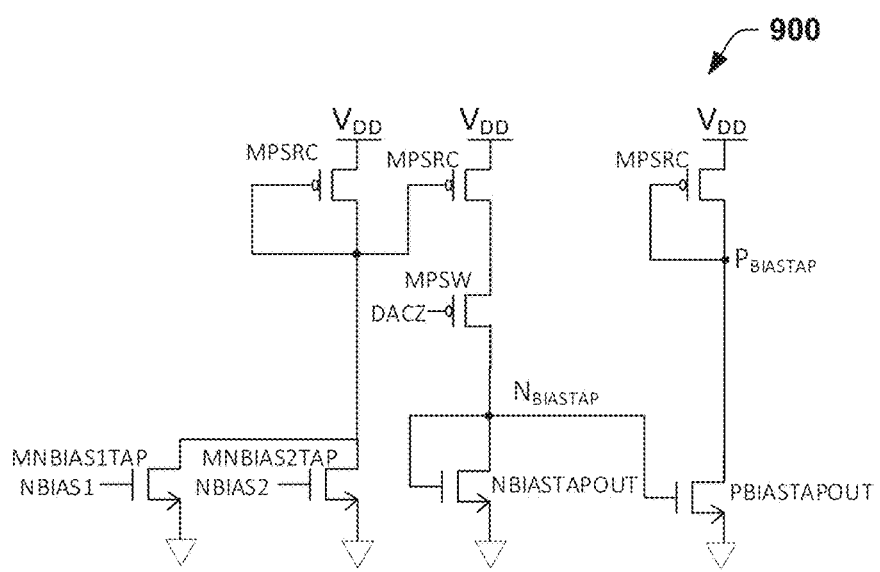
FIG. 9

TIME-BASED DECISION FEEDBACK EQUALIZER

TECHNICAL FIELD

The present disclosure relates to a time-based decision feedback equalizer (DFE).

BACKGROUND

Intersymbol Interference (ISI) is a major source of error in high speed communication applications. Equalizers can be applied to both transmitters and receivers of such links to reduce or eliminate the effect of ISI. Among these equalizers, DFEs can be used. A DFE stores and feeds back the decisions that the DFE has made for previously received bits and subtracts the ISI of these stored bits from a present signal characterizing a current received bit. In some examples, a DFE can be programmed to offset (e.g., undo or mitigate) an effect of a channel (e.g., a transmission line).

SUMMARY

In an example, a time-based equalizer can be coupled to a channel to receive an input signal. The time-based equalizer can include a plurality of delay cells and a summation circuit. Each delay cell can be configured to receive the input signal and time shift edges of the received input signal from initial edge time locations to new edge time locations over a time interval for detecting the input signal to generate time-edge shifted input signals. Each time-edge shifted input signal can compensate for distortion effects that a given previously received input signal has on the input signal. The summation circuit can be configured to combine the time-edge shifted input signals to provide a compensated signal. The compensated signal can be an edge-modulated version of the input signal that has been offset for ISI effects caused by each previously received input signal on the input signal.

In another example, a receiver that can be coupled to a channel to receive input signals can include a front-end circuit and a time-based DFE circuit. The front-end circuit can be configured to receive an input signal from the channel and amplify the input signal. The time-based DFE circuit can be configured to receive the amplified input signal and compensate for distortions in the amplified input signal caused by at least one previously received input signal to provide an ISI compensated input signal. The time-based DFE circuit can be configured to compensate for the distortions by edge time shifting respective edges of the input signal in time over a time interval for detecting the input signal to new edge time locations based on a feedback signal and edge movement signals. The feedback signal can be generated based on the at least one previously received input signal.

In a further example, a method for time-based decision feedback equalization can include receiving from a channel an input signal having distortions that can be caused by previously received input signals received from the channel and shifting edges of multiple instances of the received input signal in time from initial edge time locations to new edge time locations over a time interval for detecting the input signal to generate time-edge shifted input signals. Each time-edge shifted input signal can compensate for ISI effects that a given previously received input signal can have on the input signal. The method can further include combining the time-edge shifted input signals to provide a compensated signal. The compensated signal can be an edge-modulated version of the input signal that has been offset for the ISI effects.

BRIEF DESCRIPTION OF THE DRAWINGS

FIG. 6 illustrates an example of a biasing voltage circuit.
FIG. 7 illustrates an example of a biasing current source circuit.
FIG. 8 illustrates an example of a biasing signal generation circuit.
FIG. 9 illustrates another example of a biasing signal generation circuit.

DETAILED DESCRIPTION

Figure 1:
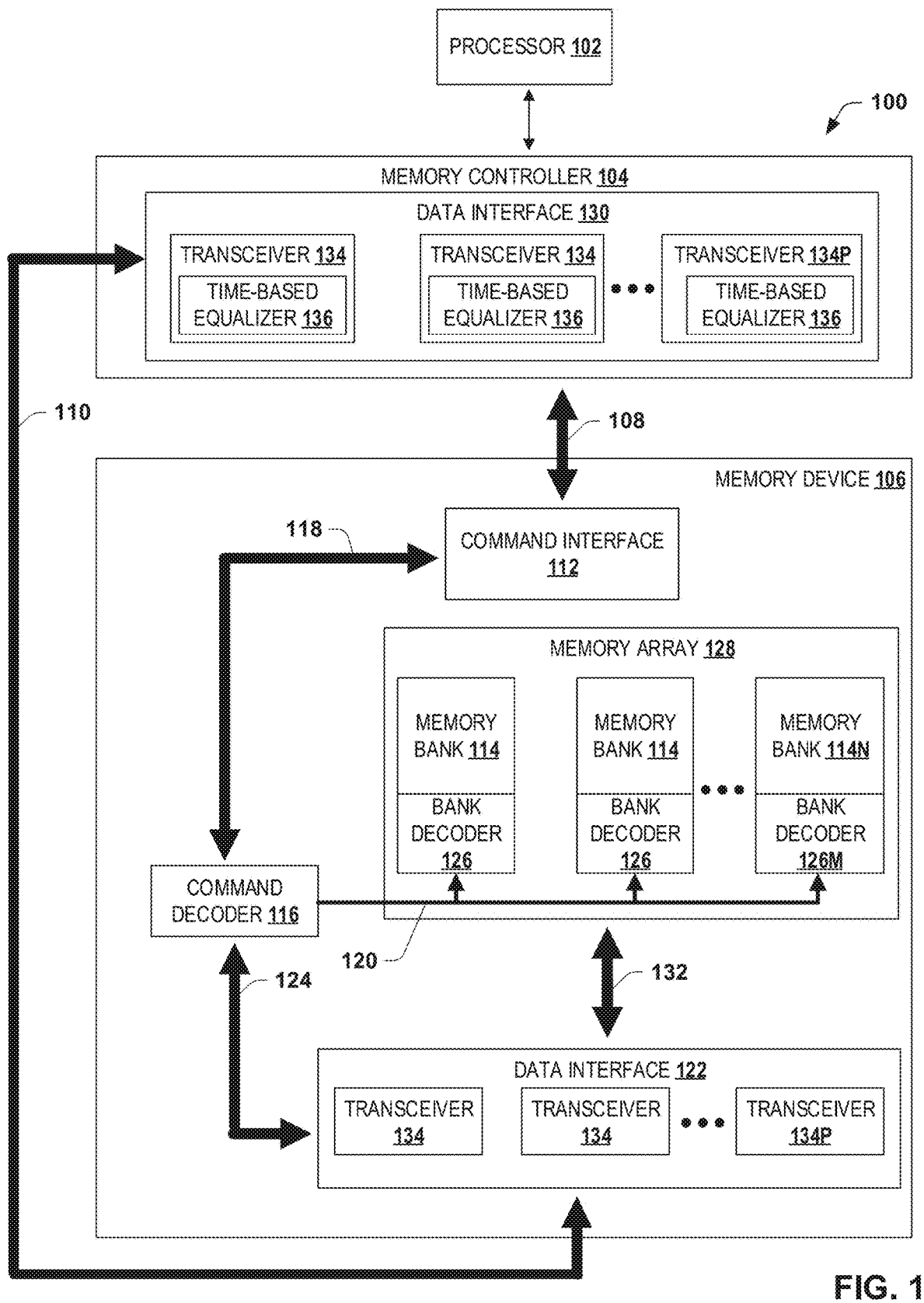
FIG. 1 illustrates an example of a computing system.

The present disclosure relates to a time-based decision feedback equalizer (DFE). Data transmitted along a signal line (e.g., a communication channel) can be affected by ISI in which previously transmitted data interferes with subsequently received data. The previously transmitted data can influence the currently transmitted data, such that the currently transmitted data cannot be accurately determined. In high speed data applications, for example, memory device applications, data errors can be introduced into the data due the effects of ISI, resulting from physical characteristics of the communication channel.

In some examples, to compensate for the effects of ISI, a time-based equalizer as described herein may be employed. As described herein, the time-based equalizer can be configured to receive an input signal (e.g., such as a bit). The time-based equalizer can be configured to compensate for the distortion effects caused by previously received input signals (e.g., such as bits) on the input signal by shifting in time respective edges of the input signal based on the previously received input signals and edge movement signals. In some examples, the edge movement signals can include edge strength shift signals and a polarity time shift signal. In some examples, each previously detected input signal can be referred to as a feedback signal (or bit). The time-based equalizer can be configured to modulate (e.g., shift in time) the respective edges of the input signal based on the feedback bit and the edge movement signals. By way of example, the modulation can include advancing or delaying the respective edges in time to new initial edge time locations from initial edge time locations over a time interval for detecting the input signal.

In some examples, the edge strength shift signals can be provided to the time-based equalizer to cause the time-based equalizer to implement time edge shifting of a given edge (e.g., a rising edge or a falling edge) of the input signal. Thus, the edge strength shift signals can specify an edge strength movement of the given edge of the input signal (e.g., an amount in time relative to the initial edge time location of the given edge that the given edge is to be shifted in time over a bit period or unit interval (UI) to the new initial edge time location). In further examples, the polarity time shift signal can specify an edge polarity movement of the given edge of the input signal (e.g., whether the given edge of the input signal is to have a positive time shift or a negative time shift in time relative to the initial edge time location of the given edge). In additional examples, the feedback bit can specify when in time the time-based equalizer is to implement the time edge shifting of the given edge relative to the bit period of the input signal. In some examples, the bit period or the UI can correspond to a period of time that the input signal can be detected. Thus, in some examples, the bit period or the UI can be greater than a time length of the input signal. In other examples the bit period or the UI can be equal to the time length of the input signal.

In some examples, the time-based equalizer can include a plurality of delay cells. Each delay cell can correspond to a tap. Thus, in some examples, the delay cell (or the tap) can be referred to as a time-based tap. By way of further example, each delay cell can be configured introduce a zero-timing offset, a positive timing offset or a negative timing offset with respect to the input signal to modulate (e.g., time shift) the input signal corresponding to manipulating respective edges of the input signal. Thus, each delay cell can be configured to receive the input signal and modulate the input signal to provide a modulated output signal.

In some examples, the zero-timing offset can cause the rising edge and the falling edge of the input signal to not be advanced or delayed in time relative to respective initial edge time locations over the bit period. To advance the given edge of the input signal as used herein can include manipulating (e.g., moving or shifting) the given edge from the initial edge time location to a new edge time location that can be less than the initial edge time location over the bit period. To delay the given edge of the input signal as used herein can include manipulating (e.g., moving or shifting) the given edge from the initial edge time location to the new edge time location that can be greater than the initial edge time location over the bit period. The positive timing offset can cause the rising edge of the input signal to be delayed in time over the bit period and the falling edge of the input signal to be advanced in time over the bit period. The negative timing offset can cause the rising edge of the input signal to be advanced in time over the bit period and the falling edge of the input signal to be delayed in time over the bit period.

In some examples, outputs of each of the delay cells can be coupled, such that the modulated output signal from each of the delay cells can be combined (e.g., summed) to provide a distortion compensated output signal. As such, the time-based equalizer, as described herein, can be configured to shift a waveform of the input signal in time in comparison to voltage-based equalizers that are configured to add and subtract voltage offsets to compensate for the ISI from previously received input signals. Thus, the time-based equalizer, as described herein, can be configured to improve an eye performance of transceiver in comparison to voltage-based DFE transceivers. Accordingly, the time-based equalizer, as described herein, can provide for a time-based DFE technique that enables closing of a DFE loop with a greater time margin when compared to voltage based DFE techniques.

FIG. 1 illustrates an example of a computing system 100. The computing system 100 can include a processor 102. The processor 102 can represent a processing unit of a host device that can execute an operating system (OS) and applications, which can collectively be referred to as a "host." The OS and applications execute operations that can result in memory accesses. Exemplary host devices can include a desktop computer, a laptop computer, a cellular phone, a personal organizer, a portable audio player, a tablet, a control circuit, a camera, a smart watch, a virtual reality headset, a network node, such as a router or a server, a copier, a scanner, a printer, a game console, a television, a set-top video distribution or a recording system, a cable box, a personal digital media player, a factory automation system, an automotive computer system, or a medical device. In other examples, a different type of host device may be employed for implementing features and functions of the computing system 100, as described herein. In some examples, the processor 102 can include one or more separate processors. Each separate processor can include a single or a multicore processing unit. In some examples, the processing unit can be a primary processor, such as a central processing unit (CPU) or a peripheral processor, such as a graphics processing unit (GPU). In some examples, the computing system 100 can be implemented as a system on chip (SOC), or be implemented with standalone components.

The computing system 100 can include a memory controller 104. By way of example, the memory controller 104 is illustrated as separate from the processor 102 in the example of FIG. 1. However, in other examples, the processor 102 can include the memory controller 104. Thus, in some examples, the memory controller 104 can be part of processor 102, such as logic implemented on a same die or implemented in a same package space as the processor 102. The memory controller 104 can be representative of one or more controller circuits or devices for the computing system 100. The memory controller 104 can include or represent control logic that generates memory access commands in response to the execution of operations by the processor 102. The memory controller 104 can be configured to communicate with a memory device 106. In some examples, each memory controller 104 can communicate with a given memory device 106. In other examples, each memory controller 104 can communicate with one or more memory devices 106.

In further examples, each memory controller 104 can be configured to manage a separate memory channel, although the computing system 100 can be configured to have multiple channels managed by a single memory controller 104 or to have multiple memory controllers 104 on a single channel. By way of further example, the memory controller 104 can include drivers, receivers, transmitters, transceivers (e.g., a transceiver 134), termination, and/or other circuitry to send or receive signals on signal lines coupling the memory controller 104 and the memory device 106. A grouping of signals lines (e.g., signal paths, including pins, pads, connectors and/or conductive traces or wires)) can be referred to as a bus. In other examples, a given signal line may be referred to as a bus. The memory controller 104 and the memory device 106 can include pins, pads, connectors, traces, wires, and/or other hardware to connect these devices to each other. In some examples, wires within an integrated circuit interface can be configured to couple a pad, pin, or connector to enable interfacing of signal lines or traces or other wires between memory controller 104 and the memory device 106.

In some examples, a group of signal lines can be implemented between the memory controller 104 and the memory device 106 and grouped to provide a command bus 108. The command bus 108 can include an address bus and a control bus. The memory controller 104 can be configured to communicate a clock signal and a command (e.g., a read or write command) via the command bus 108 to the memory device 106. In other examples, the clock signal can be provided from an external device (e.g., from the processor 102 or another device). Address locations (e.g., address registers) to be accessed during the read and/or write commands can be communicated by the memory controller 104 via the address bus to the memory device 106. Thus, the command bus 108 can be employed by the memory controller 104 to communicate the clock signal, commands, and address locations for implementing read and write actions at the memory device 106. In further examples, a group of signals lines can be employed to provide a data bus 110 between the memory controller 104 and the memory device 106. Data can be sent to and from the memory device 106 via the data bus 110 based on the commands, the clock signal and the address locations provided via the command bus 108 from the memory controller 104.

By way of example, the command bus 108 may be of a given bus width, such as to accommodate commands and addresses of a particular size. For example, the command bus 108 can be a 14-bit bus, such that the command bus 108 can accommodate command and/or address signals that are 14 bits in length. In some examples, a command interface 112 of the memory device 106 can be configured to receive a chip select signal. The chip select signal can enable the memory device 106 to process commands on the incoming command and/or address signals. Access to a particular memory bank (e.g., a memory bank 114) within the memory device 106 can be encoded onto the 14-bit bus with the commands. In other examples, the command interface 112 of the memory device 106 can be configured to receive a number of other command signals.

For example, a command and/or address on die termination signal can be provided to facilitate proper impedance matching within the memory device 106. A reset command signal can be used to reset the command interface 112, status registers, state machines, etc., such as during power-up of the memory device 106. In some examples, the command interface 112 can be configured to receive a command and/or address invert signal to invert the state of command and/or address signals on the command bus 108 based on the command and/or address routing for the particular memory device 106. In some examples, a mirror signal can be received at the command interface 112 to facilitate a mirror function. The mirror signal can be used to multiplex signals, such that the signals can be swapped and thus enable certain routing of signals to the memory device 106, based on the configuration of multiple memory devices in a particular application. Various signals to facilitate testing of the memory device 106, such as a test enable signal, can be provided to the command interface 112, in some examples. For example, the test enable signal can be used to place the memory device 106 into a test mode for connectivity testing or determining characteristics of a communication channel for ISI compensation, as described herein. In even further examples, the command interface 112 can be used to provide an alert signal to the processor 102 or the memory controller 104 in response to errors being detected at the memory device 106. For example, an alert signal can be transmitted from the memory device 106 in response to a cyclic redundancy check error being detected. Other alert signals can also be generated.

In some examples, the memory device 106 can be implemented as a memory module (e.g., a board). By way of example, the memory device 106 may be implemented as a dual in-line memory module (DIMM). In additional or alternative examples, the memory device 106 may be implemented as a double data rate type (DDR) device. Thus, in some examples, the memory device 106 can be implemented as a double data rate 3 (DDR3) device, a double data rate 4 (DDR4) device, a low power DDR3 (LPDDR3) device, a low power DDR4 (LPDDR4) device, a Wide I/O 2 (WIO2) device, a high bandwidth memory (HBM) dynamic random-access memory (DRAM) device, a HBM 2 DRAM (HBM2 DRAM) device, a double data rate 5 (DDR5) device or a low power DDR5 (LPDDR5) device (e.g., a mobile DDR device).

In some examples, each memory device 106 can be organized and managed as different channels, where each channel couples to buses and signal lines that couple to multiple memory devices 106 in parallel. Each channel can be independently operable. Thus, each channel can be independently accessed and controlled, and the timing, data transfer, command and address exchanges, and other operations can be separate for each channel. As used herein, coupling can refer to an electrical coupling, communicative or a physical coupling. Physical coupling can include direct contact. Electrical coupling can include an interface or interconnection that can allow electrical flow and/or signaling between components or devices. Communicative coupling can include connections, including wireless, that enable components to exchange data. In some examples, the computing system 100 can employ a DDR5 protocol. In other examples, any communication protocol may be employed for data read and write operations.

By way of further example, the memory device 106 can include N number of memory banks 114, wherein N is an integer equal to or greater to one. In some examples, the memory banks 114 can be implemented as DDR5 SDRAM memory banks. In further examples, the memory banks 114 can be provided on one or more chips (e.g., SDRAM chips) that can be arranged on DIMMs. Each DIMM can include a K number of data interfaces of SDRAM memory chips, wherein K is an integer greater than or equal to two. In some examples, each DIMM can include ×4, ×8, ×16, and ×32 data interfaces. As such, in some examples, the memory device 106 can represent a portion of a single memory chip (e.g., SDRAM chip) that can have a given number of memory banks 114. In some examples, the memory banks 114 can be arranged into bank groups. For example, for an 8 gigabit (Gb) DDR5 SDRAM, the memory device 106 can include 16 memory banks 114 that can be arranged into 8 bank groups, wherein each bank group can include 2 memory banks. By way of further example, for a 16 GB DDR5 SDRAM, the memory device 106 can include memory banks 114 that can be arranged into 8 bank groups, wherein each bank group can include 4 memory banks. Various other configurations, organization and sizes of the memory banks 114 on the memory device 106 can be utilized or implemented.

In some examples, the memory device 106 can include the command interface 112. The command interface 112 can be configured to receive the clock signal and the commands (e.g., read and write commands) from the command bus 108. Thus, the command interface 112 can be coupled to the command bus 108. In examples wherein the memory device 106 is implemented as a DDR device, such as the DDR5 memory device, a differential pair of clock signals can be communicated via the command bus 108 from the memory controller 104 to the memory device 106. In some examples, the differential pair of clock signals can include a true clock signal and a complementary clock signal. The command interface 112 can be configured to generate an internal clock signal and supply the internal clock to various components within the memory device 106 based on the differential pair of clock signals, such as for processing of the commands.

In some examples, the memory device 106 can include a command decoder 116. The command decoder 116 can be configured to receive the command from the command interface 112 via a decoder access bus 118. A command signal can be generated by the command interface 112 based on the command received from the command bus 108. Thus, the command decoder 116 can be configured to decode commands, such as read commands, write commands, mode-register set commands, activate commands, etc., and provide access via a bank access bus 120 to a particular memory bank 114 corresponding to the command. Thus, the command decoder 116 can be configured to receive the commands via the decoder access bus 118 and decode the commands to provide decoded commands for various internal control of the memory device 106. For example, the command decoder 116 can be configured to provide a decoded command signal to an internal clock generator of the memory device 106 (not shown in FIG. 1) over a communication bus (not shown in FIG. 1) to coordinate generation of a phase controlled internal clock signal based on the clock signal received via the command bus 108. The phase controlled internal clock signal can be generated by a delay locked loop (DLL) circuit of the memory device 106 (not shown in FIG. 1). The phased controlled internal clock signal can be supplied to a data interface 122 of the memory device 106 via a data interface bus 124 and can be used as a timing signal for determining an output timing of read data from the memory banks 114. Thus, the phased controlled internal clock signal can be used to clock data through the data interface 122 of the memory device 106, such as described herein.

In some examples, each memory bank 114 can be associated with a respective bank decoder 126 that can be configured to provide decoding (e.g., row and column decoding), as well as other features, such as timing control and data control, to implement the execution of the commands to and from the memory banks 114 based on the decoded commands provided via the bank access bus 120 to respective bank decoders 126 from the command decoder 116. In some examples, each memory bank 114 can be associated with a corresponding bank decoder 126. Thus, the memory device 106 can include an M number of bank decoders 126, wherein M is an integer greater than or equal to one. In some examples, the memory banks 114 and the bank decoders 126 can define (e.g., form) a memory array 128, as illustrated in FIG. 1.

In additional or alternative examples, the memory device 106 can include various other components, such as power supply circuits (for receiving external $V_{DD}$ and $V_{SS}$ signals), mode registers (e.g., to define various modes of programmable operations and configurations), read/write amplifiers (e.g., to amplify signals during read/write operations), temperature sensors (e.g., for sensing temperatures of the memory device 106). As described herein, data may be written to and read from the memory device 106, for example, by the memory controller 104, whereby the memory device 106 can operate as volatile memory, such as DDRAM (e.g., DDR5 SDRAM). In some examples, the computing system 100 can include non-volatile memory (not shown in FIG. 1), such as read-only memory (ROM), PC-RAM, silicon-oxide-nitride-oxide-silicon (SONOS) memory, metal-oxide-nitride-oxide-silicon (MONOS) memory, polysilicon floating gate based memory, and/or other types of flash memory of various architectures (e.g., NAND memory, NOR memory, etc.) as well as other types of memory devices (e.g., storage), such as solid state drives (SSD's), MultimediaMediaCards (MMC's), SecureDigital (SD) cards, CompactFlash (CF) cards, or any other suitable device.

In additional or alternative examples, the computing system 100 can include one or more external interfaces, such as a Universal Serial Bus (USB), a Peripheral Component Interconnect (PCI), a PCI Express (PCI-E), a Small Computer System Interface (SCSI), an IEEE 1394 (Firewire), or any other suitable interface as well as one or more input devices to allow a user to provide data into the computing system 100, for example, buttons, switching elements, a keyboard, a light pen, a stylus, a mouse, and/or a voice recognition system, for example. In further examples, the computing system 100 can include an output device, such as a display coupled to the processor 102 and a network interface device, such as a Network Interface Card (NIC), for interfacing with a network, such as an Internet. As such, the computing system 100 can include many other components, depending on the application of the computing system 100. For purposes of brevity and clarity these other components have been omitted with respect to FIG. 1.

By way of further example, to send data to and from the memory device 106 based on the commands and addresses received at the command interface 114 and the clock signal, the memory device 106 can employ the data interface 122. The data interface 122 can be configured to send or retrieve the data from the memory banks 114 over a local memory bus 132. The local memory bus 132 can correspond to a bi-directional data bus. Thus, in some examples, the local memory bus 132 can be referred to as a local bi-directional data bus. The data interface 122 can be configured to receive data signals via the data bus 110 from a data interface 130 of the memory controller 104 and provide the received data signals via the local memory bus 132 to the memory banks 114. Thus, the memory controller 104 can employ the data interface 130 to send data to and from the memory controller 104, such as based on signaling received from the processor 102. In examples wherein the memory device 106 is implemented as a DDR5 SDRAM memory device, the data signals can be referred to as DQ signals. In these examples, the DQ signals can be divided into upper and lower DQ signals corresponding to upper and lower bytes of the data signals. For example, for an ×16 memory device, the DQ signals can be divided into upper and lower I/O signals, wherein a first 8 bits correspond to the upper bytes and the remaining 8 bits correspond to the lower bytes.

In some examples, to allow for higher data rates within the memory device 106, the memory device 106 can be configured to utilize data strobe signals referred to as DQS signals. The DQS signals can be driven by the processor 102 or the memory controller 104 sending the data (e.g., for a write command) or by the memory device 106 (e.g., for a read command). In some examples, for read commands, the DQS signals can be additional data DQ signals with a predetermined pattern, and thus can be sent via the data bus 110 (e.g., a subset of signal lines of the grouping of signal lines defining the data bus 110). For write commands, the DQS signals can be used as clock signals to capture the corresponding input DQ signal to the memory device 106. In some examples, the DQS signals may be provided as a differential pair of DQS signals to provide differential pair signaling during reads and writes with respect to the memory device 106. In further examples, the differential pairs of DQS signals can be divided into upper and lower data strobe signals corresponding to upper and lower bytes of data sent to and from the memory device 106, such as in DDR5 SDRAM memory implemented devices.

In some examples, each of the data interfaces 122, 130 can include a P number of transceivers 134, wherein P is a number equal to a bus width of the data bus 110. Each signal line (e.g., transmission line or channel) of the data bus 110 can have an associated transceiver 134. Thus, a 14-bit bus having 14 sign lines can have 14 transceivers 134, wherein each transceiver 134 can be associated with a given signal line of the 14 signal lines defining (e.g., forming) the data bus 110. The data signals (e.g., DQ data signals) generated by the memory controller 104 can be provided via respective signal lines of the data bus 110 to corresponding transceivers 134 of the data interface 122, such as during a data write operation. In additional or alternative examples, the data signals generated by the memory device 106 can be provided via respective signals lines of the data bus 110 to corresponding transceivers 134 of the data interface 130, such as during a data read operation. In some examples, at least some of the corresponding transceivers 134 can be coupled via a DQ connector to a respective signal line of the data bus 110 to receive the respective the DQ data signals. The DQ connector can include a pin, a pad, or any type of interface that can operate to receive DQ data signals, such as for example, for transmission of DQ data signals to the memory array 128 during the data write operation. In some examples, the DQ connector can be employed to transmit the DQ data signals from the memory device 106, for example, such as during a data read operation. In some examples, at least some of the transceivers 134 can be configured to receive one or more DQS signals to operate in strobe data mode, such as part of the data write operation.

In some examples, the DQS signals can be received at a DQS connector (e.g., a pin, pad, the combination thereof, etc.) of the data interface 122 and routed to the corresponding transceiver 134 of the data interface 122 via a DQS transceiver (not shown in FIG. 1) that can be configured to control a data strobe mode via selective transmission of the DQS signals to the corresponding transceiver 134. Thus, in some examples, the corresponding transceiver 134 of the data interface 122 can be configured receive DQS signals to control the data write operation to the memory array 128. As such, in some examples, each transceiver 134 of the data interface 122 can be configured to operate in modes to facilitate the transfers of DQ data (e.g., the DQ data signals) to and from the memory array 128. In some examples, to allow for higher data rates within the memory device 106, each transceiver 134 can be configured to operate in a data strobe mode in which DQS signals can be employed. The DQS signals can be driven by the processor 102 or the memory controller 104 sending the data (e.g., for a write command) as received by the DQS connector. In some examples, the DQS signals can be used as clock signals to capture corresponding DQ data.

In some examples, each transceiver 134 of the data interface 122 can include a serializer-deserializer (not shown in FIG. 1). The serializer-deserializer can be configured to translate serial data bits (e.g., a serial bit stream) on a respective signal line into parallel data bits (e.g., a parallel bit stream) for transmission along the data bus 110 during data write operations of the memory device 106. In some examples, the serializer-deserializer can be configured to translate parallel data bits (e.g., a parallel bit stream) into serial data bits (e.g., a serial bit stream) during read operations of the memory device 106 for transmission along a respective signal line of the data bus 110. As such, the serializer-deserializer can be configured to translate data received from, for example, the memory controller 104 or the processor 102 having a serial format into a parallel format suitable for storage at the memory array 128. In other examples, the serializer-deserializer can be configured to translate data received from, for example, the memory array 128 having a parallel format into a serial format suitable for transmission to the memory controller 104 or the processor 102. In further examples, at least some of the transceivers 134 of the data interface 130 can be configured to include a serializer-deserializer, as described herein with respect to the data interface 122.

In further examples, each transceiver 134 can include a receiver and transmitter (not shown in FIG. 1). During the write operation, the memory controller 104 can be configured to transmit the DQ data signals as DQ data in a serial form (e.g., by serializing the DQ data signals via a corresponding serializer) across the data bus 110 to the receiver at a corresponding transceiver 134 of the data interface 122. The DQ data can be received at the DQ connector and provided to the receiver. The receiver can be configured to perform one or more operations on the DQ data (e.g., amplification, driving of the data signals, etc.) and/or may operate as a latch for the DQ data until reception of a respective DQS signal that operates to coordinate (e.g., control) the transmission of the DQ data, for example, to a deserializer of the serializer-deserializer. The deserializer can be configured to convert (e.g., translate) the DQ data from a format (e.g., a serial format) in which the DQ data is transmitted along the data bus 110 into another format (e.g., a parallel format), in some examples, for transmission along the local memory bus 132 to the memory array 128 for storage therein.

In some examples, such as during the read operation (e.g., reading stored data from the memory array 128 and transmitting the read data as read DQ data to the memory controller 104 or the processor 102 via the data bus 110), a serializer of the serializer-deserializer at the data interface 122 can be configured to receive the read DQ data from the memory array 128 in one format (e.g., a parallel format) and convert (e.g., translate) the read DQ data into a second format (e.g., a serial format), such that the read DQ data can be transmitted to the memory controller 104 or the processor 102. In some examples, the converted DQ data can be configured to be transmitted from the serializer to the transmitter, whereby one or more operations on the converted DQ data (e.g., de-amplification, driving of the data signals, etc.) can occur. For example, during the read operation, a transmitter of the transceiver 134 can be configured to transmit the DQ data signals as DQ data in a serial form across the data bus 110 to a receiver at a corresponding transceiver 134 of the data interface 130.

In some examples, the DQ data received at the corresponding transceiver 134 of the data interface 130 via the data bus 110 from the memory device 106 can be distorted. For example, the DQ data received at the corresponding transceiver 134 of the data interface 130 can be affected by ISI in which previously received DQ data at the corresponding transceiver 134 of the data interface 130 interferes with subsequently received DQ data. For example, the DQ data received at the corresponding transceiver 134 of the data interface 130 can be distorted relative to the DQ data transmitted by the memory device 106 to the memory controller 104. To mitigate (e.g., offset or cancel) this distortion, the corresponding transceiver 134 of the data interface 130 can be configured with a time-based equalizer 136. The time-based equalizer 136 can effectively reverse the effects of ISI by applying time-based equalization operations to the distorted DQ data. In some examples, the receiver of the corresponding transceiver 134 of the data interface 130 can be configured with the time-based equalizer 136. In additional or alternative examples, one or more receivers of the transceivers 134 of the data interface 122 at the memory device 106 can be configured with the time-based equalizer 136. As such, although examples are presented herein with the time-based equalizer 136 being implemented at the memory controller 104, in other examples, the time-based equalizer 136 can be implemented at the memory device 106. Moreover, although the time-based equalizer 136 is illustrated in the example of FIG. 1 being implemented within memory device applications, such as a DDR5 application, the time-based equalizer 136 presented herein should not be limited or construed to only memory device applications. As such, the time-based equalizer 136 can be implemented on any device that receives data on a transmission line from another device that can be distorted by ISI.

In some examples, the time-based equalizer 136 can be configured as a time-based DFE. The time-based equalizer 136 can include multiple taps. By way of example, the time-based equalizer 136 can include three taps. Each tap can be implemented as a delay cell. In further examples, each delay cell can be implemented in parallel to receive a transmitted bit n. In some examples, the transmitted bit n can be referred herein as an input signal. When a data bit is received at the corresponding transceiver 134 of the data interface 130, the data bit can be identified as bit "n" and can be received at time $t_0$, as a distorted bit n (e.g., bit n having been distorted by ISI). The most recent bit received prior to the distorted bit n, e.g., received at time of $t_1$ preceding time $t_0$, may be identified as n−1. In some examples, each received data bit of the DQ data transmitted via the data bus 110 from the memory device 106 can be stored as sampled data at a sample register (e.g., a data register or a data latch) (not shown in FIG. 1). The sample register can be employed to store received data bits and can be latched or transmitted along paths (e.g., signal lines) from the sample register to the time-based equalizer 136.

By way of further example, a second most recent bit received prior to the distorted bit n at the transceiver 134 of the data interface 130, e.g., received at time $t_2$ can be identified as n−2, and can be transmitted along a corresponding path to the time-based equalizer 136 from the sample register. A third most recent bit received prior to the distorted bit n at the transceiver 134 of the data interface 130, e.g., received at time $t_3$ can be identified as n−3, and can be transmitted along a corresponding path to the time-based equalizer 136 from the sample register. The bits n−1, n−2, and n−3 can be referred to as interfering bits that can interfere and thus distort the received bit n (e.g., the bits n−1, n−2, and n−3 can cause ISI to transmitted bit n over the data bus 110 from the memory device 106). In some examples, the bits n−1, n−2, and n−3 received at the time-based equalizer 136 can be referred to previously received input signals. The time-based equalizer 136 can be configured to implement a given number of taps based on a determined number of previous bits that interfere with the transmitted bit n. Thus, in examples, wherein three previous bits (e.g., the bits n−1, n−2, and n−3) have been determined to cause ISI to the transmitted n, the time-based equalizer 136 can be configured with three taps.

To mitigate the distortion caused by the group of bits preceding the transmitted bit n, such as the bits n−1, n−2, and n−3, the time-based equalizer 136 can be configured to receive the transmitted bit n (e.g., the input signal) and the previously detected bits (e.g., the bits n−1, n−2, and n−3) from the sample register. Based on the previous bits, the input signal can be delayed to implement time-based DFE, thereby enhancing the detection timing and voltage window for detection of the received transmitted bit n. By way of example, each delay cell of the time-based equalizer 136 can be configured to receive the transmitted bit n and a corresponding previous received bit. Thus, each delay cell can be configured to receive the transmitted bit n and one of the previously detected bits (e.g., the bits n−1, n−2, and n−3). The previously detected bits can be referred to as feedback bits.

By way of example, the time-based equalizer 136 can be configured to compensate for the distortion effects caused by at least one previously received input signal on the input signal by time edge shifting respective edges of the input signal based on at least one feedback bit and edge movement signals. The time-based equalizer 136 can be configured to modulate (e.g., time edge shift) the respective edges of the input signal based on the at least one feedback bit and the edge movement signals, such that the respective edges are one of advanced or delayed in time relative to initial edge time locations in time over a bit period or a UI for the input signal.

The edge movement signals can be provided to the time-based equalizer 136 to cause the time-based equalizer 136 to implement time edge shifting of a given edge (e.g., a rising edge or a falling edge) of the input signal. Thus, the edge movement signals can specify an edge strength movement of the given edge of the input signal (e.g., an amount in time relative to the initial edge time location that the given edge of the input signal is to be shifted by the time-based equalizer 136). The edge movement signals can further specify an edge polarity movement of the given edge of the input signal (e.g., whether the given edge of the input signal is to have a positive time shift or a negative time shift relative to the initial edge time location in time). The at least one feedback bit can control when in time the time-based equalizer 136 is to implement the edge shifting of the given edge.

To compensate for ISI the time-based equalizer 136 can be configured to implement time edge shifting with respect to the input signal. Time edge shifting can include a zero-timing offset, a positive timing offset or a negative timing offset. The zero-timing offset can cause the rising edge and the falling edge of the input signal to not be advanced or delayed in time relative to the initial edge time locations of the input signal over the bit period. The positive timing offset can cause the rising edge of the input signal to be delayed in time over the bit period and the falling edge of the input signal to be advanced in time over the bit period. The negative timing offset can cause the rising edge of the input signal to be advanced in time over the bit period and the falling edge of the input signal to be delayed in time over the bit period.

By way of further example, each of the delay cells of the time-based equalizer 136 can be configured to receive the input signal and introduce a corresponding delay, such as one of the positive or negative timing offsets. In some examples, outputs of each of the delay cells can be coupled, such that the modulated output signal from each of the delay cells can be combined (e.g., summed) to provide a distortion compensated output signal. As such, the time-based equalizer 136 can be configured to shift a waveform of the input signal in time in comparison to voltage-based equalizers that are configured to add and subtract voltage offsets to compensate for the ISI from previously received input signals. Thus, the time-based equalizer 136 can be configured to improve an eye performance of transceiver in comparison to voltage-based DFE transceivers. Accordingly, the time-based equalizer 136 can be configured to provide for a time-based DFE technique that enables closing of a DFE loop with a greater time margin when compared voltage based DFE techniques.

Figure 2:
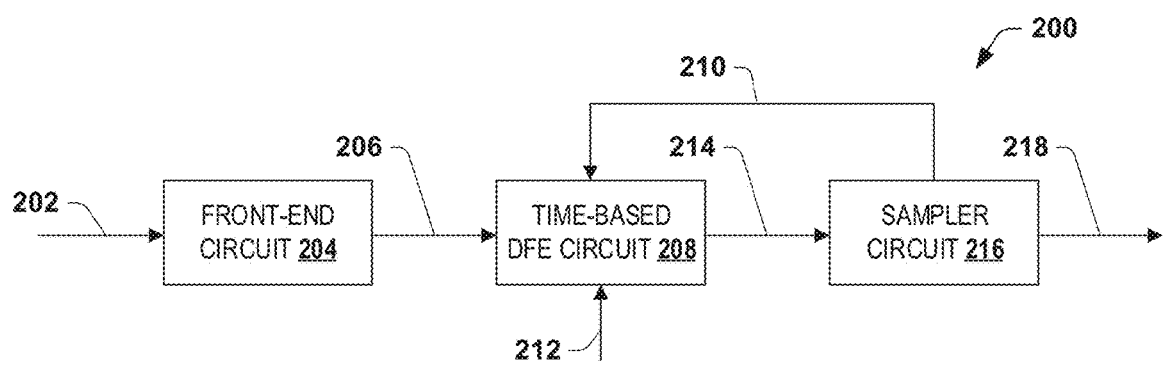
FIG. 2 illustrates an example of a receiver.

FIG. 2 illustrates an example of a receiver 200. In some examples, the receiver 200 can correspond to the receiver of the transceiver 134 of the data interface 130, as illustrated in FIG. 1. Thus, in some examples, the receiver can be implemented at a memory controller, such as the memory controller 104, as illustrated in FIG. 1. In additional or alternative examples, the receiver 200 can be implemented at a memory device, such as the memory device 106, as illustrated in FIG. 1. As such, in some examples, the receiver 200 can be implemented on a DDR5 memory device. In other examples, the receiver 200 can be implemented at a processor, such as the processor 102 (e.g., a CPU, a GPU, etc.), as illustrated in FIG. 1. By way of further example, the receiver 200 can be employed at a physical interface (not shown in FIG. 2), such as the data interface 122 or the data interface 130, as illustrated in FIG. 1. In some examples, the physical interface can include circuitry for handling timing requirements of transferred data (e.g., to or from the device), commands, addresses and strobes. For example, the physical interface can include delay circuitry that can be configured to locate a data strobe in a data eye.

In some examples, the receiver 200 can be associated with (e.g., coupled to) a given signal line (e.g., a communication channel, a transmission line, a wire trace or line, etc.). By way of example, the given signal line can be part of a set of signal lines forming a bus, such as the data bus 110, as illustrated in FIG. 1. In some examples, each signal line of the bus can be associated with a corresponding receiver 200. In other examples, the bus can correspond to a communication bus (e.g., a data bus) between devices, such as GPUs, CPUs, or a combination of GPUs and CPUs. Thus, in some examples, the bus can correspond to a serial data bus or a parallel data bus.

As described herein, data transferred between devices, such as the memory controller 104 and the memory device 106 of FIG. 1, over the given signal line can be become degraded by channel characteristics of the given signal line once the transferred data arrives at the receiver 200. The channel characteristics can introduce ISI. For high-speed communication buses (e.g., in a multi-gigabit range), ISI can be introduced from high frequency signal attenuation and reflections due to impedance discontinuities in the given signal line. ISI can degrade signal quality (e.g., the data), such that distinctions between originally transmitted signals characterizing the data can be lost. To compensate for ISI, the receiver 200 can be configured to implement time-based decision feedback equalization to mitigate (e.g., cancel) the effects of ISI on the data (e.g., the bit n).

By way of example, an input signal 202 (e.g., the bit n) corresponding to the data can be received at a front-end circuit 204 of the receiver 200. The front-end circuit 204 can be configured to amplify the input signal 202 and output an amplified input signal 206. In some examples, the front-end circuit 204 can include one or more taps of voltage-based DFE. In these examples, the one or more taps can correspond to unrolled taps. For example, multiple instances of the receiver 202 may be employed and used to compare the input the signal to different reference voltages and a decision to select one of the outputs can be taken after sample of the signal (e.g., using a sampler circuit, such as described herein). The reference voltages can be selected to cancel ISI of a respective channel, and thus compensate for signal distortion in the input signal 202 caused by the previously received input signals. Thus, in some examples, the front-end circuit 204 can partially offset the distortion effects caused by the previously received input signals. As such, in some examples, the amplified input signal 206 can correspond to a partially compensated version of the input signal 202 that has been partially corrected for distortion effects caused by the previously received input signals on the input signal 202. In some examples, the voltage-based DFE may be omitted from the front-end circuit.

In further examples, the amplified input signal 206 can be provided to a time-based DFE circuit 208. In some examples, the time-based DFE circuit 208 can correspond to the time-based equalizer 136, as illustrated in FIG. 1. The time-based DFE circuit 208 can be configured to compensate for the distortion effects caused by the previously received input signals on the input signal 202. In some examples, time-based DFE circuit 208 can be configured to further compensate for the distortion effects caused by the previously received input signals on the input signal 202. In these examples, the front-end circuit 204 can be configured to partially compensate for the distortion effects caused by the previously received input signals on the input signal 202, and the time-based DFE circuit 208 can provide further compensation for the distortion effects caused by the previously received input signals on the input signal 202.

By way of example, the time-based DFE circuit 208 can be configured to compensate for the distortion effects caused by the previously received input signals on the amplified input signal 206 by time edge shifting respective edges of the amplified input signal 206 based on at least one feedback signal 210 (e.g., a previously detected input signal) (e.g., bit n−1, bit n−2, and/or bit n−3) and edge movement signals 212. The edge movement signals 212 can include edge strength shift signals and a polarity time shift signal. In some examples, each previously detected input signal can be referred to as a feedback signal (or bit). The time-based DFE circuit 208 can be configured to modulate the respective edges of the amplified input signal 206 based on the feedback signal 210 and the edge movement signals 212, such as one of advancing or delaying the respective edges in time relative to an initial edge time location of the respective edges over a time interval for detecting the input signal 202. The edge movement signals 212 can be provided to the time-based DFE circuit 208 to implement edge shifting of a given edge (e.g., a rising edge or a falling edge) of the amplified input signal 206. Thus, the edge movement signals 212 can specify an edge strength movement of the given edge of the amplified input signal 206 (e.g., an amount in time relative to the initial edge time location of the amplified input signal 206 that the given edge of the amplified input signal 206 is to be shifted). In some examples, the edge movement signals 212 can also specify an edge polarity movement of a given edge of the amplified input signal 206 (e.g., whether the given edge of the amplified input signal 206 is to have a positive time shift or a negative time shift in time relative to the initial edge time location over the bit period). In further examples, the feedback bit 210 can control when in time the time-based DFE circuit 208 is to implement the edge shifting of the given edge.

In some examples, the time-based DFE circuit 208 can be configured based on the feedback signal 210 and the edge movement signals 212 to introduce a zero-timing offset, a positive timing offset and/or a negative timing offset with respect to the amplified input signal 206. The zero-timing offset can cause a rising edge and a falling edge of the amplified input signal 206 to not be advanced or delayed in time relative to respective initial edge time locations over the bit period. The positive timing offset can cause the rising edge of the amplified input signal 206 to be delayed in time over the bit period and the falling edge of the amplified input signal 206 to be advanced in time over the bit period. The negative timing offset can cause the rising edge of the amplified input signal 206 to be advanced in time over the bit period and the falling edge of the amplified input signal 206 to be delayed in time over the bit period.

In some examples, the time-based DFE circuit 208 can include a plurality of delay cells (not shown in FIG. 2). Each delay cell can be configured to apply one of the zero timing offset, the positive timing offset and the negative timing offset to the amplified input signal 206. Thus, each delay cell can be configured to receive the amplified input signal 206 and in response to receiving the amplified input signal 206, in some examples, modify the respective edges of the amplified input signal 206 to provide a time edge shifted input signal. In other examples, at least one delay cell of the plurality of delay cells can be configured to pass the amplified input signal 206, such that the respective edges of the amplified input signals 206 are not time edged shifted over the bit period.

By way of further example, at least some of the delay cells of the plurality of delay cells can be configured to shift the respective edges of the amplified input signal 206 by a given amount of time corresponding to a time delay. The time delay can correspond to the given amount of time that respective edges of the amplified input signal 206 have been shifted relative to respective initial edge time locations based on the feedback signal 210 and the edge movement signals 212. Thus, at least one delay cell of the plurality of delay cells can be configured to introduce a timing offset to modify (e.g., modulate) respective edges of the amplified input signal 206 to provide a respective time-edge shifted input signal. In some example, the time-based DFE circuit 208 can include a summation circuit (not shown in FIG. 2). The summation circuit can be configured to receive each time-edge shifted input signal provided by the plurality of delay cells based on respective feedback and edge movement signals 210, 212. The summation circuit can be configured to combine (e.g., sum) the time-edge shifted input signals to provide an output signal 214 that can be a version of the input signal 202 (e.g., the bit n) that has been compensated for distortion effects caused by at least one previously received input signal (e.g., the bit n–1, n–2, n–3, etc.). The output signal 214 resulting from the summing can have respective edges at edge time locations that can be based on a total time delay from each edge time shift implemented by at least one delay cell of the plurality of delay cells.

In even further examples, the receiver 200 can include a sampler circuit 216. The sampler circuit 216 can be configured to sample the output signal 214 and provide a sampled output signal 218 to a receiver output (e.g., an output node) (not shown in FIG. 2). In an example, the receiver output can be coupled to a decision device. The decision device can include any device capable of analyzing the sampled output signal 218 at particular points in time and quantizing the sampled output signal 218 to distinct values for bit detection. In further examples, the sampler circuit 216 can be configured to feedback the sampled output signal 218 as the feedback bit 210 for distortion correction (e.g., resulting from ISI) on a subsequent received input signal (bit).

As such, the time-based DFE circuit 208 can be configured to shift a waveform of the input signal in time in comparison to voltage-based equalizers that are configured to add and subtract voltage offsets to compensate for the ISI from previously received input signals. Thus, the time-based DFE circuit 208 can be configured to improve an eye performance of receiver 200 in comparison to voltage-based DFE receivers. Accordingly, the time-based DFE circuit 208 can be configured to provide for a time-based DFE technique that enables closing of a DFE loop with a greater time margin when compared voltage based DFE techniques.

Figure 3:
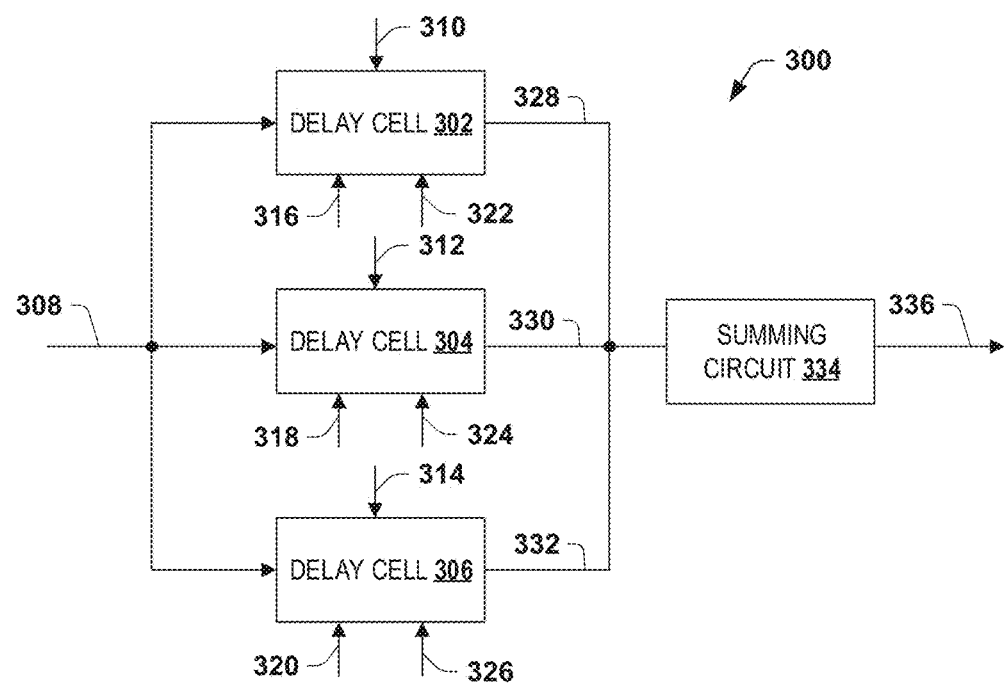
FIG. 3 illustrates an example of a time-based equalizer.

FIG. 3 illustrates an example of a time-based equalizer 300. The time-based equalizer 300 can be configured to compensate for distortions in a received input signal (e.g., a currently received bit, such as the bit n) being caused by previously received input signals (e.g., previously received bits, such as the bit n–1, n–2, n–3, etc.). The time-based equalizer 300 can be configured to use the previously received input signals to mitigate distortions in the received input signal. In some examples, the time-based equalizer 300 can correspond to the time-based equalizer 136, as illustrated in FIG. 1 or the time-based DFE circuit 208, as illustrated in FIG. 2. By way of example, the time-based equalizer 300 can include an N number of delay cells 302-306, wherein N is an integer greater than or equal to one. The number of delays cells of the time-based equalizer 300 can be based on an influence that previously received input signals (e.g., bit n–1, n–2, n–3, n–4, etc.) can have on a currently received input signal (e.g., bit n). A previously received input signal can influence the currently received input signal by affecting and/or interfering with the currently received input signal. For example, if three most recent previously received input signals (e.g., the bit n–1, n–2 and n–3) have a greater influence than a fourth previously received input signal (e.g., bit n–4), the time-based equalizer 300 can be configured with three (3) delays cells, such as a first delay cell 302, a second delay cell 304, and a third delay cell 306, as illustrated in FIG. 3. In some examples, the time-based equalizer 300 can include less delay cells or more delay cells, such as illustrated in FIG. 3, and the number of delay cells can be based on channel characteristics (e.g., signal line characteristics) over which data signals are received by the time-based equalizer 300. The data signals received by the time-based equalizer 300 can be referred to as input signals. Moreover, the examples presented herein with respect to FIG. 3 should not be construed or limited to time-based equalizers employing three delay cells.

By way of example, to compensate for distortions being caused by the previously received input signals, each of the delays cells 302-306 can be configured to provide a level of compensation based on a distortion effect that the previously received input signal has on the received input signal (e.g., currently received bit, such as the bit n). For example, if a first previously received input signal (e.g., bit n−1) received at time $t_0$ has a greater distortion effect than a second previously received input signal (e.g., bit n−1) received at time $t_1$ preceding the time $t_0$, a given delay cell, such as the first delay cell 302 can be configured to have a greater distortion mitigating effect (e.g., of reversing the effects of ISI) than a different delay cell, such as the second delay cell 304 and the third delay cell 306. Thus, the first delay cell 302 can be configured based on the distortion effect that the first previously received bit has on the currently received bit, such that the first delay cell 302 can have a greater distortion mitigating effect in comparison to the second and third delay cells 304-306. In some examples, the second delay cell 304 can be configured to have a distortion mitigating effect based on the distortion effect that the second previously received bit (e.g., bit n−2) has on the currently received bit (e.g., bit n), and the third delay cell 306 can be configured to have a distortion mitigating effect based on the distortion effect that the third previously received bit (e.g., bit n−3) has on the currently received bit (e.g., bit n). In additional or alternative examples, the second or the third delay cells 304-306 can be configured to have a greater distortion mitigating effect than the first delay cell 302.

By way of example, each delay cell 302-306 can be configured to receive an input signal 308 (e.g., a currently received bit, such as the bit n). In some examples, the input signal 308 can correspond to the amplified input signal 206, as illustrated in FIG. 2. In other examples, the input signal 308 can correspond to the input signal 202, as illustrated in FIG. 2. Each of the delay cells 302-306 can be configured to compensate for distortion effects a corresponding previously received input signal (e.g., bit n−1, n−2 and n−3) has on the input signal 308. To compensate for the distortion effects caused by the corresponding previously received input signal, each delay cell 302-306 can be configured to receive a corresponding feedback signal (or bit) 310-314. In some examples, the corresponding feedback signal 310-314 can correspond to the feedback signal 210, as illustrated in FIG. 2. Thus, in these examples, the corresponding feedback signal 310-314 can be provided by a sampler circuit, such as the sampler circuit 216, as illustrated in FIG. 2. Each corresponding feedback signal 310-314 can correspond to a previously detected input signal. Thus, the feedback signal 310 can correspond to a first previously detected input signal (e.g., bit n−1), the feedback signal 312 can correspond to a second previously detected input signal (e.g., bit n−2), and the feedback signal 314 can correspond to a third previously detected input signal (e.g., bit n−3).

In some examples, each of the delay cells 302-306 can be configured to receive the input signal 308 and introduce a respective timing offset to edge time shift a respective received input signal 308 by a given amount of time. The timing offset implemented by each of the delay cells 302-306 can include one of a zero timing offset, a positive timing offset and a negative timing offset. Each of the delay cells 302-306 can be configured to introduce a corresponding timing offset to shift in time respective edges of the respective received input signal 308 to compensate for distortion effects being caused by a corresponding previously received input signal (e.g., bit n−1, n−2 and n−3). Thus, each of the delay cells 302-306 can be configured to modulate the respective edges of the respective received input signal 308, such as one of advance or delay the respective edges in time relative to an initial edge time location of the respective edges in time over a time interval for detecting the input signal 308.

For example, to compensate for the distortion effects caused by the corresponding previously received input signal, each delay cell 302-306 can be configured to shift in time the respective edges of the respective received input signal 308 based on a corresponding feedback signal 310-314 (e.g., bit n−1, n−2 and bit n−3), respective edge strength shift signals 316-320, and a respective polarity time shift signal 322-326. In some examples, corresponding edge strength shift signals 316-320 and polarity time shift signal 322-326 can define edge movement signals for a respective delay cell 302-306. In further examples, the edge movement signals can correspond to the edge movement signals 212, as illustrated in FIG. 2.

By way of example, the respective feedback signals 310-314 can control when in time a corresponding delay cell 302-306 is to implement the time edge shifting of the given edge. The respective edge strength shift signals 316-320 can be provided to the corresponding delay cell 302-306 to implement the time edge shifting of the given edge (e.g., a rising edge or a falling edge) of the respective received input signal 308. Thus, the respective edge strength shift signals 316-320 can specify an edge strength movement of the given edge of the respective received input signal 308. At least one delay cell 302-306 can be configured edge time shift the respective received input signal 308 from the initial edge time location of the given edge to a new edge time location over the bit period.

By way of further example, the respective polarity time shift signal 322-326 received at a corresponding delay cell 302-306 can specify an edge polarity movement of the given edge of the respective received input signal 308 (e.g., whether the given edge of the respective received input signal 308 is to have a positive time shift or a negative time shift in time relative to the initial edge time location of the given edge). The corresponding delay cell 302-306 can be configured to implement positive or negative time shift with respect to the given edge, such that the given edge relative to the initial edge time location is shifted in a positive time direction or a negative time direction over the bit period. For example, if the respective edge strength shift signals 316-320 cause the corresponding delay cell 302-306 to shift the given edge by about 10 picoseconds (ps) from the initial edge time location for the given edge over the bit period, the respective polarity time shift signal 322-326 can control the shifting of the given edge in a positive or a negative time direction relative to the initial edge time location. Thus, as an example, if the initial edge time location for the given edge over the bit period is at about 18.5 nanoseconds (ns), the corresponding delay cell 302-306 can be configured to shift −10 ps the given edge based on the respective polarity time shift signal 322-326, such that the new edge time location for the given edge over the bit period is at about 18.49 ns.

In some examples, the time edge shifting implemented at the corresponding delay cell 302-306 based on the respective edge strength shift signals 316-320 and the respective polarity time shift signal 322-326 can introduce one of the zero timing offset, the positive timing offset and the negative timing offset into the respective received input signal 308 to provide a time-edge shifted input signal 328-332. As an example, to introduce the zero timing offset, the corresponding delay cell 302-306 can be configured to cause the rising edge and the falling edge of the respective received input signal 308 to not be advanced or delayed in time relative to respective initial edge time locations for the edges over the bit period based on the respective edge strength shift signals 316-320 and the respective polarity time shift signal 322-326.

In additional or alternative examples, to introduce the positive timing offset, the corresponding delay cell 302-306 can be configured to cause the rising edge of the respective received input signal 308 to be delayed in time over the bit period and the falling edge of the respective received input signal 308 to be advanced in time over the bit period based on the respective edge strength shift signals 316-320 and the respective polarity time shift signal 322-326. In further examples, to introduce the negative timing offset, the corresponding delay cell 302-306 can be configured to cause the rising edge of the respective received input signal 308 to be advanced in time over the bit period and the falling edge of the respective received input signal 308 to be delayed in time over the bit period based on the respective edge strength shift signals 316-320 and the respective polarity time shift signal 322-326.

Accordingly, each of the delay cells 302-306 can be configured to implement one of the zero timing offset, the positive timing offset and the negative timing offset with respect to the respective received input signal 308 to provide a corresponding time-edge shifted input signal 328-332. In some examples, each delay cell 302-306 implementing the positive timing offset or negative timing offset can be configured to modulated (e.g., move in time) the respective edges of the respective received input signal 308 to a new edge time location by shifting the respective edges from the initial edge time location to the new edge time location over the bit period. In response to implementing timing offset with respect to the respective received input signal 308, each of the delay cells 302-306 can be configured to provide the time-edge shifted input signal 328-332. In some examples, at least some of the time-edge shifted input signals provided by the delay cells 302-306 can be an edge modified version of the respective received input signal 308 provided by the corresponding delay cell 302-306. Thus, the at least some of the time-edge shifted input signals can have edges at new edge time locations different from the edge time locations of the respective received input signal 308 at the corresponding delay cell 302-306. Accordingly, at least some of the delay cells 302-306 can be configured to delay in time the respective edges of the respective received input signal 308 by time shifting respective edges of the respective received input signal to provide a corresponding time-edge shifted input signal 328-332.

By way of further example, each of respective time-edge shifted input signals 328-332 can be supplied to a summation circuit 334. The summation circuit 334 can be configured to combine the time-edge shifted input signals 328-332 to provide an output signal 336. In some examples, the output signal 336 can correspond to the output signal 214, as illustrated in FIG. 2. The output signal 336 resulting from the combining (e.g., summing) can have respective edges at edge time locations based on a total time delay from each time edge shifting implemented by the delay cell 302-306. Thus, the time-edge shifted input signals 328-332 can be combined to provide the output signal 336 having respective edges located in time over the bit period that can be based on an amount of time (e.g., the time delay) that the respective edges of the respective received input signal 308 have been shifted by the corresponding delay cell 302-306 to the new edge time locations from the initial edge time locations of the respective edges.

Accordingly, the time-based equalizer 300 can be configured to compensate for effects of ISI being caused by previously received input signals (e.g., previously received bits) on the input signal (e.g., a currently received bit) by manipulating in time respective edges of the input signal 308. As such, the time-based equalizer 300 can shift a waveform of the input signal 308 to compensate for ISI effects in time in comparison to voltage-based equalizers that are configured to add and subtract voltage offsets to compensate for ISI effects. Thus, the time-based equalizer 300 can open an eye of a receiver or transceiver (e.g., the transceiver 134 of the data interface 122 or the data interface 130, as illustrated in FIG. 1 or the receiver 200, as illustrated in FIG. 2). The time-based equalizer 300 can be configured to provide for a time-based DFE technique that enables closing of a DFE loop with a greater time margin in comparison to voltage based DFE techniques.

Figure 4:
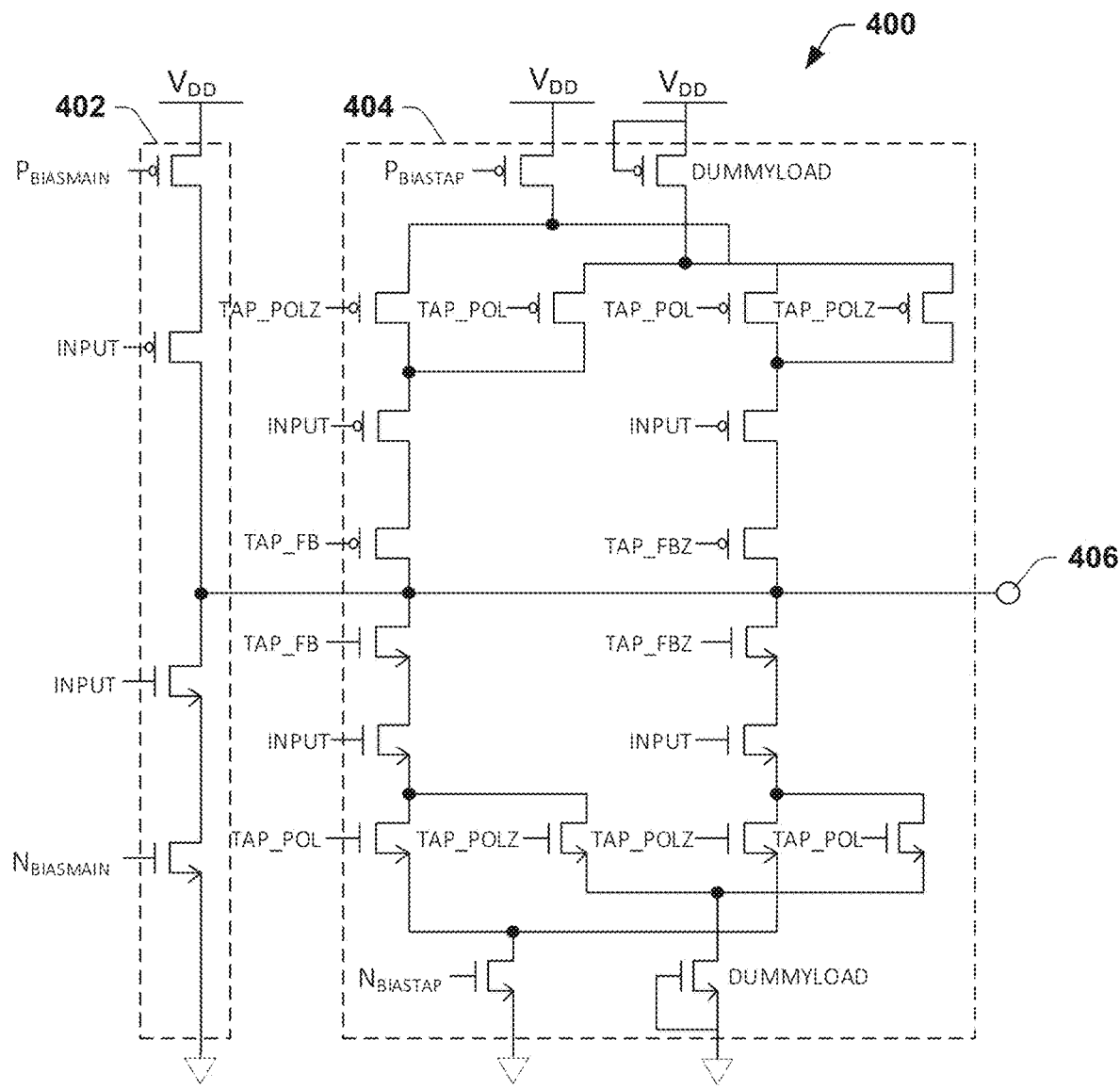
FIG. 4 illustrates an example of a delay cell.

FIG. 4 illustrates an example of a delay cell 400. In some examples, the delay cell 400 can be representative of the first delay cell 302, the second delay cell 304 or the third delay cell 306, as illustrated in FIG. 3. Thus, in some examples, references can be made to the example of FIGS. 1-3 in the description with respect to FIG. 4. The delay cell 400 can be configured to modulate respective edges of an input signal (labeled in FIG. 4 as "INPUT") to shift in time over a time interval for detecting the input signal INPUT the respective edges of the input signal INPUT by a given amount in time. In some examples, the delay cell 400 can be configured to shift in time a rising edge of the input signal INPUT by a similar amount in time as a falling edge of the input signal INPUT. In further examples, the input signal INPUT can correspond to the input signal 202, as illustrated in FIG. 2 or the input signal 308, as illustrated in FIG. 3. In some examples, the delay cell 400 can be configured to shift in time the rising edge of the input signal INPUT by a similar amount in time as the falling edge of the input signal INPUT.

By way of example, the delay cell 400 can include a main branch 402 and tap branch 404. Each of the main and tap branches 402-404 can be controlled based on switch control signaling to control switching operations of field effect transistors (FETs) of each branch 402-404 to implement time edge shifting with respect to the input signal INPUT, such as described herein. In some examples, the FETs can be implemented as metal-oxide-semiconductor FET (MOSFETs). Thus, the plurality of FETs can include N-type MOSFETs and P-type MOSFETs.

Each of the main and tap branches 402-404 can be controlled based on biasing signals (labeled in FIG. 4 as "$P_{BIASMAIN}$," "$N_{BIASMAIN}$", "$P_{BIASTAP}$," and "$N_{BIASTAP}$"), a polarity signal (labeled in FIG. 4 as "TAP_POL") and a feedback signal (labeled in FIG. 4 as "TAP_FB) to introduce a timing offset with respect to the input signal INPUT. In some examples, the biasing signals $P_{BIASMAIN}$, $N_{BIASMAIN}$, $P_{BIASTAP}$ and $N_{BIASTAP}$ can correspond to (e.g., form part of) edge movement signals, such as the edge movement signals 212, as illustrated in FIG. 2 or corresponding edge strength shift signals 316-320, as illustrated in FIG. 3. In additional examples, the feedback signal TAP_FB can correspond to the feedback signal 210, as illustrated in FIG. 2 or a corresponding feedback signal 310-314, as illustrated in FIG. 3. In further examples, the polarity signal TAP_POL can correspond to the respective polarity time shift signal 322-326, as illustrated in FIG. 3. Thus, in some examples, the respective polarity time shift signal 322-326 can form part of the edge movement signals, as described herein.

In some examples, the timing offset can include a zero-timing offset, a positive timing offset and a negative timing offset. The zero-timing offset can cause the rising edge and the falling edge of the input signal INPUT to not be advanced or delayed in time relative to respective initial edge time locations over the bit period. The positive timing offset can cause the rising edge of the input signal INPUT to be delayed in time over the bit period and the falling edge of the input signal INPUT to be advanced in time over the bit period. The negative timing offset can cause the rising edge of the input signal to be advanced in time over the bit period and the falling edge of the input signal to be delayed in time over the bit period.

As illustrated in FIG. 4, the biasing voltages $P_{BIASMAIN}$ and $N_{BIASMAIN}$ can be configured to control gate to source voltages ($V_{GS}$) of respective FETs within the main branch 402. Further, as illustrated in FIG. 4, the biasing voltages $P_{BIASTAP}$ and $N_{BIASTAP}$ can be configured to control $V_{GS}$ of respective FETs within the tap branch 404. If $V_{GS}$ of respective FETs of the tap branch 404 is greater than the $V_{GS}$ of respective FETs of the main branch 402, then a current within the tap branch 404 based on a source voltage $V_{DD}$ can be greater than a current based on the source voltage $V_{DD}$ within the main branch 402. If $V_{GS}$ of respective FETs of the main branch 402 is greater than the $V_{GS}$ of respective FETs of the tap branch 404, then the current within the main branch 402 can be greater than the current within the tap branch 404. Thus, to introduce time edge shifting with respect to the input signal INPUT, such as to shift the rising and falling edges of the input signal INPUT, the current through the main branch 402 can be decreased, such as by decreasing (e.g., an amplitude of) the biasing voltages $P_{BIASMAIN}$ and $N_{BIASMAIN}$ in the main branch 402, and the current through the tap branch 404 can be increased, such as by increasing (e.g., an amplitude of) the biasing voltages $P_{BIASTAP}$ and $N_{BIASTAP}$ at the tap branch 404. As illustrated in FIG. 4, the main branch 402 can be configured to have no dependency on the feedback signal TAP_FB, whereas the tap branch 404 switching operations can be based on the feedback signal TAP_FB. Thus, in some examples, if the tap branch 404 has a greater current (e.g., is stronger) relative to the main branch 402, the time edge shifting (e.g., an amount of time the rising and falling edges of the input signal INPUT are shifted relative to initial edge time locations) can be greater (e.g., stronger). As such, the amount of DFE offset or time edge shifting of the respective edges of the input signal INPUT can be stronger.

In some examples, as illustrated in FIG. 4, the tap branch 404 can include dummy loads (labeled in FIG. 4 as "DUMMYLOAD"). The dummy loads can be configured to balance the amount of delay when the biasing voltages $N_{BIASTAP}$ and $P_{BIASTAP}$ are off and allow for symmetric rising and falling delays with respect to the edges of the input signal INPUT. As illustrated in FIG. 4, the tap branch 404 can be configured to receive an inverse feedback signal (labeled in FIG. 4 as "TAP_FBZ") and an inverse polarity signal (labeled in FIG. 4 as "TAP_POLZ"). Thus, in some examples, the tap branch 404 can be configured to introduce the timing edge offset with respect to the input signal INPUT based on the polarity signal TAP_POL, the inverse polarity signal TAP_POLZ, the feedback signal TAP_FB, and the inverse feedback signal TAP_FBZ. In some examples, such during operation of the delay cell 400, the delay cell 400 can configured to delay the respective edges of the input signal INPUT based on the feedback signal TAP_FB and the inverse feedback signal TAP_FBZ, introduce a time delay polarity into to the input signal INPUT based on the polarity signal TAP_POL and the inverse polarity signal TAP_POLZ, and control a strength of DFE feedback (e.g., an amount of time that the respective edges are to be delayed relative to respective initial edge time locations) based on the biasing signals $P_{BIASMAIN}$, $N_{BIASMAIN}$, $P_{BIASTAP}$ and $N_{BIASTAP}$.

For example, to introduce the negative timing offset with respect to the input signal INPUT, the rising edge of the input signal INPUT can be made faster (e.g., advanced in time over the bit period relative to the initial edge time location of the rising edge of the input signal INPUT), and the falling edge of the input signal INPUT can be slowed (e.g., delayed in time over the bit period relative to the initial edge time location of the falling edge of the input signal INPUT). As such, the main branch 402 can be configured to advance the rising edge of the input signal INPUT in time over the bit period and the tap branch 404 can be configured to delay the falling edge of the input signal INPUT in time over the bit period according to the feedback signal TAP_FB, the inverse feedback signal TAP_FBZ, the polarity signal TAP_POL, and the inverse polarity signal TAP_POLZ based on the biasing signals $P_{BIASMAIN}$, $N_{BIASMAIN}$, $P_{BIASTAP}$ and $N_{BIASTAP}$, thereby effectively introducing negative timing offset into the input signal INPUT.

In some examples, to advance the rising edge of the input signal INPUT and delay the falling edge of the input signal INPUT, the branch containing $P_{BIASMAIN}$ and $P_{BIASTAP}$ can be switched on to make the rising edge faster, the $N_{BIASMAIN}$ branch can be switched on and $N_{BIASTAP}$ can be switched off to make the falling edge slower. The strength of gate to source voltage $V_{GS}$ on $P_{BIASMAIN}$, $P_{BIASTAP}$, $N_{BIASMAIN}$, $N_{BIASTAP}$ can control how much time delay can be introduced. As such, the feedback signal TAP_FB, the inverse feedback signal TAP_FBZ, the polarity signal TAP_POL, and the inverse polarity signal TAP_POLZ can be applied to the main and tap branches 402-404 to advance the rising edge and delay the falling edge of the input signal INPUT received at the delay cell 400.

In some examples, to introduce the positive timing offset with respect to the input signal INPUT, the rising edge of the input signal INPUT can be made slower (e.g., delayed in time over the bit period relative to the initial edge time location of the rising edge of the input signal INPUT), and the falling edge can be advanced (e.g., advanced in time over the bit period relative to the initial edge time location of the falling edge of the input signal INPUT). For example, to implement the positive timing offset, the main branch 402 can be configured to delay the rising edge of the input signal INPUT in time over the bit period and the tap branch 404 can be configured to advance the falling edge of the input signal INPUT in time over the bit period according to the feedback signal TAP_FB, the inverse feedback signal TAP_FBZ, the polarity signal TAP_POL, and the inverse polarity signal TAP_POLZ based on the biasing signals $P_{BIASMAIN}$, $N_{BIASMAIN}$, $P_{BIASTAP}$ and $N_{BIASTAP}$, thereby effectively introducing positive timing offset into the input signal INPUT.

In some examples, to delay the rising edge of the input signal INPUT and advance the falling edge of the input signal INPUT, the branch containing $N_{BIASMAIN}$ and $N_{BIASTAP}$ can be switched on to make the falling edge faster, the $P_{BIASMAIN}$ branch can be switched on and $P_{BIASTAP}$ can be switched off to make the rising edge slower. The strength of gate to source voltage $V_{GS}$ on $P_{BIASMAIN}$, $P_{BIASTAP}$, $N_{BIASMAIN}$, $N_{BIASTAP}$ can control how much delay can be introduced. As such, the feedback signal TAP_FB, the inverse feedback signal TAP_FBZ, the polarity signal TAP_POL, and the inverse polarity signal TAP_POLZ can be applied to the main and tap branches 402-404 to delay the rising edge and advance the falling edge of the input signal INPUT received at the delay cell 400. Accordingly, the delay cell 400 can be configured to modulate respective edges (e.g., the rising edge and the falling edge) of the input signal INPUT and output a time-edge shifted input signal at node 406. In some examples, the time-edge shifted input signal can correspond to a respective time-edge shifted input signal 328-332, as illustrated in FIG. 3.

Figure 5:
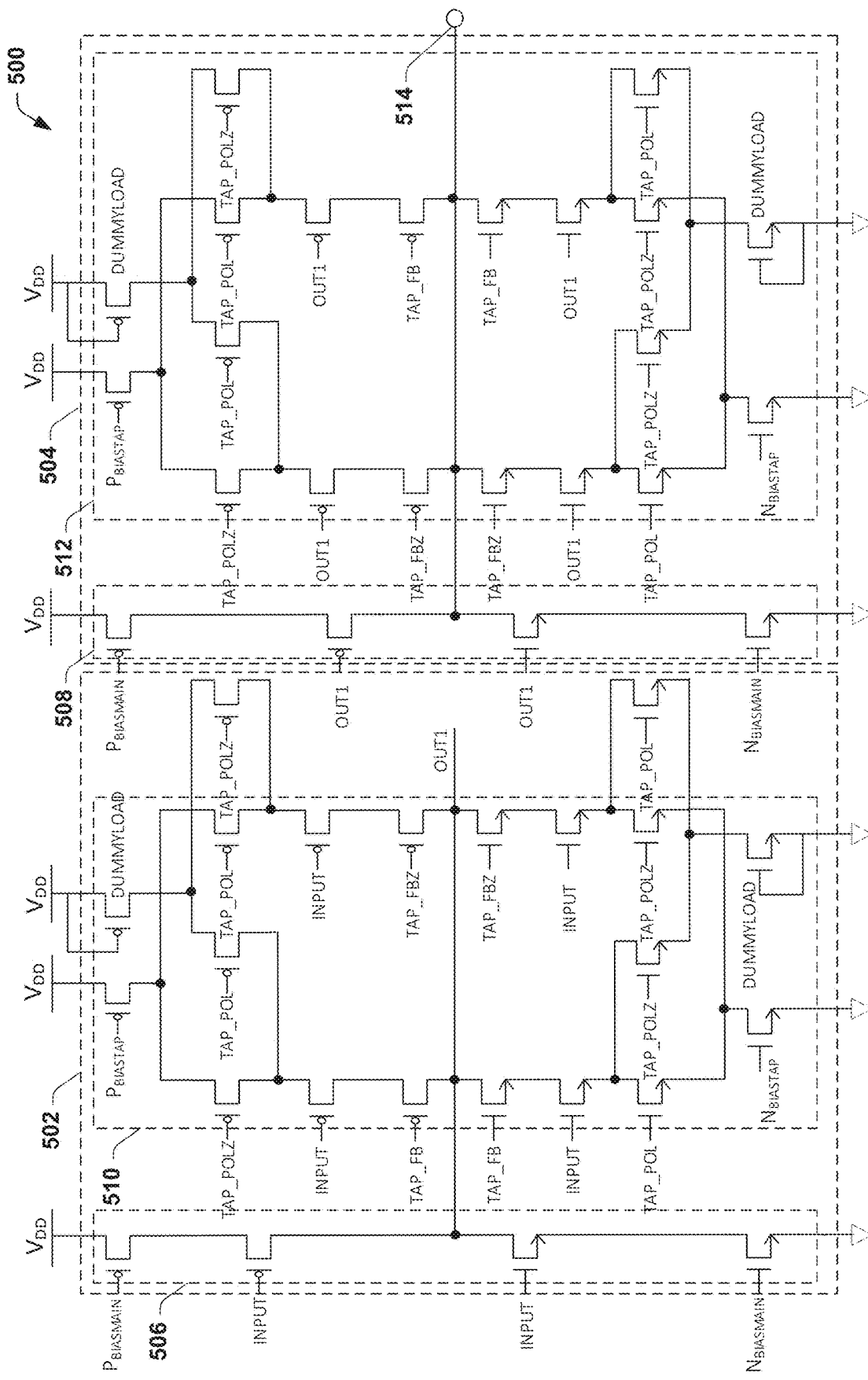
FIG. 5 illustrates another example of a delay cell.

FIG. 5 illustrates another example of a delay cell 500. In some examples, the delay cell 500 can be representative of the first delay cell 302, the second delay cell 304 or the third delay cell 306, as illustrated in FIG. 3. Thus, in some examples, references can be made to the example of FIGS. 1-3 in the description with respect to FIG. 5. The delay cell 500 can be configured to modulate respective edges of an input signal (labeled in FIG. 5 as "INPUT") to shift in time over a time interval for detecting the input signal the respective edges of the input signal INPUT by a given amount in time. In some examples, the delay cell 500 can be configured to shift in time a rising edge of the input signal INPUT by a similar amount in time as a falling edge of the input signal INPUT.

By way of example, the delay cell 500 can include a plurality of logic stages 502-504. Each of the plurality of logic stages 502-504 can be controlled based on signaling to control switching operations of FETs of each logic stage 502-504 to implement edge shifting with respect to the input signal INPUT. In some examples, each of the logic stages 502-504 can include a plurality of FETs. By way of example, the FETs can be implemented as MOSFETs. In some examples, the plurality of FETs can include N-type MOSFETs and P-type MOSFETs.

Each of the logic stages 502-504 can be controlled based on biasing signals (labeled in FIG. 5 as "$P_{BIASMAIN}$," "$N_{BIASMAIN}$", "$P_{BIASTAP}$," and "$N_{BIASTAP}$"), a polarity signal (labeled in FIG. 5 as "TAP_POL") and a feedback signal (labeled in FIG. 5 as "TAP_FB") to introduce a time offset with respect to the input signal INPUT. In some examples, the biasing signals $P_{BIASMAIN}$, $N_{BIASMAIN}$, $P_{BIASTAP}$ and $N_{BIASTAP}$ can correspond to (e.g., form part of) edge movement signals, such as the edge movement signals 212, as illustrated in FIG. 2 or corresponding edge movement signals 316-320, as illustrated in FIG. 3. In additional examples, the feedback signal TAP_FB can correspond to the feedback signal 210, as illustrated in FIG. 2 or a corresponding feedback signal 310-314, as illustrated in FIG. 3. In further examples, the polarity signal TAP_POL can correspond to the respective polarity time shift signal 322-326, as illustrated in FIG. 3. Thus, in some examples, the respective polarity time shift signal 322-326 can form part of the edge movement signals, as described herein.

In some examples, the timing offset can include a zero-timing offset, a positive timing offset and/or a negative timing offset. The zero-timing offset can cause the rising edge and the falling edge of the input signal INPUT to not be advanced or delayed in time over the bit period. The positive timing offset can cause the rising edge of the input signal INPUT to be delayed in time over the bit period and the falling edge of the input signal INPUT to be advanced in time over the bit period. The negative timing offset can cause the rising edge of the input signal INPUT to be advanced in time over the bit period and the falling edge of the input signal INPUT to be delayed in time over the bit period.

In some examples, each logic stage 502-504 can include a main branch 506-508 and a tap branch 510-512. As illustrated in FIG. 5, biasing voltages $P_{BIASMAIN}$ and $N_{BIASMAIN}$ can be configured to control gate to source voltages ($V_{GS}$) of respective FETs within each main branch 506, 508. Further, as illustrated in FIG. 5, the biasing voltages $P_{BIASTAP}$ and $N_{BIASTAP}$ can be configured to control $V_{GS}$ of respective FETs within each tap branch 510-512. If $V_{GS}$ of respective FETs of a corresponding tap branch 510-512 is greater than the $V_{GS}$ of respective FETs of a respective main branch 506-508, then a current based on a source voltage $V_{DD}$ within the corresponding tap branch 510-512 can be greater than a current based on the source voltage $V_{DD}$ within the respective main branch 506-508. If $V_{GS}$ of respective FETs of the respective main branch 506-508 is greater than the $V_{GS}$ of respective FETs of the corresponding tap branch 510-512, then the current within the respective main branch 506-508 can be greater than the current within the corresponding tap branch 510-512. Thus, to implement time edge shifting with respect to the input signal INPUT, the current through the respective main branch 506-508 can be decreased, such as by decreasing (e.g., an amplitude of) the biasing signals $P_{BIASMAIN}$ and $N_{BIASMAIN}$ in the respective main branch 506-508, and the current through the corresponding tap branch 510-512 can be increased, such as by increasing (e.g., an amplitude of) the biasing signals $P_{BIASTAP}$ and $N_{BIASTAP}$. As illustrated in FIG. 5, each respective main branch 506-508 can have no dependency on the feedback signal TAP_FB, whereas each tap branch 510-512 can be based on the feedback signal TAP_FB. Hence, if the corresponding tap branch 510-512 has a greater current (e.g., is stronger) relative to the respective main branch 506-508, the time shift (e.g., an amount of time the edges of the input signal INPUT are shifted relative to an initial edge time location of the input signal) can be greater (e.g., stronger). As such, an amount of DFE offset or edge time shifting of the edges of the input signal INPUT can be stronger.

In some examples, as illustrated in FIG. 5, the corresponding tap branches 510-512 can include dummy loads (labeled in FIG. 5 as "DUMMYLOAD"). The dummy loads can be configured to balance the amount of delay when the biasing voltages $N_{BIASTAP}$ and $P_{BIASTAP}$ are off and allow for symmetric rising and falling delays with respect to the edges of the input signal INPUT. As illustrated in FIG. 5, each corresponding tap branch 510-512 can be configured to receive an inverse feedback signal (labeled in FIG. 5 as "TAP_FBZ") and an inverse polarity bit (labeled in FIG. 5 as "TAP_POLZ"). Thus, in some examples, each of the corresponding tap branches 510-512 can be configured to introduce the timing offset with respect to the input signal INPUT based on the polarity signal TAP_POL, the inverse polarity signal TAP_POLZ, the feedback signal TAP_FB, and the inverse feedback signal TAP_FBZ.

In some examples, such during operation of the delay cell 500, the delay cell 500 can configured to delay respective edges of the input signal INPUT based on the feedback signal TAP_FB, the inverse feedback signal TAP_FBZ, introduce a time delay polarity into to the input signal INPUT based on the polarity signal TAP_POL and the inverse polarity signal TAP_POLZ, and control a strength of DFE feedback (e.g., an amount of time that the respective edges are to be delayed relative to an initial edge time location for the edges) based on the biasing signals $P_{BIASMAIN}$, $P_{BIASTAP}$, $N_{BIASMAIN}$, and $P_{BIASTAP}$.

For example, to introduce negative timing offset with respect to the input signal, the rising edge of the input signal INPUT has to be made faster (e.g., advanced in time over the bit period relative to the initial edge time location of the rising edge of the input signal INPUT), and the falling edge has to be slowed (e.g., delayed in time over the bit period relative to the initial edge time location of the falling edge of the input signal INPUT). For example, to implement negative timing offset at the delay cell 500, the first logic stage 502 can be configured to advance in time over the bit period the rising edge of the input signal INPUT. The first logic stage 502 can be configured to delay in time the falling edge of the input signal INPUT, the second logic stage 504 can be configured to delay in time over the bit period the falling edge of the input signal, and the second logic stage 504 can be further configured to advance in time over the bit period the rising edge of the input signal INPUT. As such, the feedback signal TAP_FB, the inverse feedback signal TAP_FBZ, the polarity signal TAP_POL, and the inverse polarity signal TAP_POLZ, and the biasing signals $P_{BIASMAIN}$, $N_{BIASMAIN}$, $P_{BIASTAP}$ and $N_{BIASTAP}$ can be employed to effectively introducing negative timing offset into the input signal INPUT.

In some examples, to advance the rising edge of the input signal INPUT, the current through the main branch 506 of the first logic stage 502 can be reduced by supplying the main branch 506 of the first logic stage 502 with appropriate values for $P_{BIASMAIN}$ and $N_{BIASMAIN}$, and by increasing the current through the tap branch 508 of the first logic stage 502 relative to the main branch 506 by supplying the tap branch 508 with appropriate values for the biasing signals $N_{BIASMAIN}$ and $N_{BIASTAP}$. Once the current through the main branch 506 has been reduced and the current through the tap branch 508 has been increased, the feedback signal TAP_FB, the inverse feedback signal TAP_FBZ, the polarity bit TAP_POL, and inverse polarity bit TAP_POLZ can be applied to advance the rising edge of the input signal INPUT. As such, the first logic stage rising edge can be made slower by switching on the $P_{BIASMAIN}$ branch of the first logic stage 502 and switching off $P_{BIASTAP}$ branch of the first logic stage 502. The first stage falling edge can be made faster by switching on both $N_{BIASMAIN}$ and $N_{BIASTAP}$ branches of the first logic stage 502. Accordingly, the first logic stage 502 can modulate the rising edge of the input signal INPUT to time shift the rising edge from the initial edge time location to a new edge time location. A rising edge modulated version of the input signal INPUT (labeled in FIG. 5 as "OUT1") can be outputted by the first logic stage 502.

In some examples, the second logic stage 504 can be configured to receive the modulated input signal OUT1 and delay the falling edge of the modulated input signal OUT1. Thus, the second logic stage 504 can be configured to further modulate the input signal OUT1, such as by time shifting the falling edge by a given amount. By way of example, to delay the falling edge of the modulated input signal OUT1, the current for the rising edge can be increased by switching on both the rising edge of a corresponding main branch 506-508 biased by $P_{BIASMAIN}$ and a rising edge of a corresponding tap branch 510-510 biased by $P_{BIASTAP}$, and the current for the falling edge can be decreased by switching on the corresponding main branch 506-508 of falling edge biased by $N_{BIASMAIN}$ and switching off the corresponding tap branch 510-512 of falling edge biased by $N_{BIASTAP}$. Thus, the feedback signal TAP_FB, the inverse feedback signal TAP_FBZ, the polarity signal TAP_POL, the inverse polarity signal TAP_POLZ can be applied to delay the falling edge of the modulated input signal OUT1. As such, in some examples, the second stage falling edge can been made slower by switching on only $N_{BIASMAIN}$ branch and switching off $N_{BIASTAP}$ branch of the second logic stage 504. Thus, the second logic stage 504 can be configured to modulate the modulated input signal OUT1 to time shift the falling edge from the initial edge time location to a new edge time location for the falling edge. The second logic stage 504 can be configured to provide a time-edge shifted input signal at output node 514. The time-edge shifted input signal can correspond to an edge shifted (e.g., rising edge and falling edge shifted) version of the input signal INPUT. In some examples, the time-edge shifted input signal can correspond to a respective time-edge shifted input signal 328-332, as illustrated in FIG. 3.

FIG. 6 illustrates an example of a biasing voltage circuit 600. In some examples, the biasing voltage circuit 600 can form part of a time-based equalizer, such as the time-based equalizer 136, as illustrated in FIG. 1, or the time-based DFE circuit 208, as illustrated in FIG. 1. In other examples, the biasing voltage circuit 600 can be a stand-alone circuit. The biasing voltage circuit 600 can be configured to generate a biasing voltage $N_{BIAS}$ for generating biasing signals, such as $N_{BIASMAIN}$, $P_{BIASMAIN}$, $N_{BIASTAP}$, and $P_{BIASTAP}$ for respective delays cells of the time-based equalizer, such as the delays cells 302-306, as illustrated in FIG. 3. Thus, the biasing signals $N_{BIASMAIN}$, $P_{BIASMAIN}$, $N_{BIASTAP}$, and $P_{BIASTAP}$ can correspond to the biasing signals $N_{BIASMAIN}$, $P_{BIASMAIN}$, $N_{BIASTAP}$, and $P_{BIASTAP}$, such as illustrated in FIGS. 4-5.

In some examples, the biasing voltage circuit 600 includes a biasing current source 602. The biasing current source 602 can be configured to generate a biasing current $I_{BIAS}$. The biasing current $I_{BIAS}$ can be provided to a gate of a transistor 604 to couple a drain of the transistor 604 to a source of the transistor 604, thereby coupling the biasing current source 602 to a ground 606. Resultantly, the biasing voltage $N_{BIAS}$ can be established at the transistor 604. In some examples, as described herein, the biasing voltage $N_{BIAS}$ can correspond to a biasing voltage $N_{BIAS1}$ of FIGS. 8-9. In some examples, respective bias voltage circuits, such as the biasing voltage circuit 600, can be employed to provide a corresponding bias voltage, such as the bias voltage $N_{BIAS1}$ and the bias voltage $N_{BIAS2}$, respectively. As such, in some examples, at least two biasing voltage circuits can be employed having a first biasing voltage circuit configured to provide the bias voltage $N_{BIAS1}$ and a second biasing voltage circuit configured to provide the bias voltage $N_{BIAS2}$.

By way of example, the biasing current $I_{BIAS}$ can be referred to as a biasing current $I_{BIAS1}$ and the biasing voltage $N_{BIAS}$ can be referred to as the biasing voltage $N_{BIAS1}$. As such, the biasing current $I_{BIAS1}$ can be represented by the following expression:

$$I_{BIAS} = \frac{V_{th}}{R}, \quad (1)$$

wherein $I_{BIAS}$ is the biasing current, $V_{th}$ is a threshold voltage of the transistor, such as a MOSFET (e.g., PMOS or NMOS), and R is a resistance of the resistor connected in series with the transistor.

In further examples, the biasing current source 602, such as in the second biasing voltage circuit, can be implemented, as a biasing current source circuit 700, as illustrated in FIG. 7. FIG. 7 illustrates an example of a biasing current source circuit 700. The biasing current source circuit 700 can be employed to generate a biasing voltage $N_{BIAS2}$, such as the bias voltage $N_{BIAS2}$, as illustrated in FIGS. 8-9. The biasing current source circuit 700 can include a resistor 702 to couple respective transistors 704-706 of the biasing current source circuit 700 to a voltage source $V_{DD}$. A respective source of each of the transistors 704-706 can be coupled to a ground 708 to establish a current path between a drain and a source of each respective transistor 706 to the ground 708. In some examples, the ground 708 can correspond to the ground 606, as illustrated in FIG. 6.

By way of further example, respective gates of the transistors 704-706 can be coupled to the resistor 702. A gate voltage $V_G$ can be established across the resistor 702 based on a source voltage provided by the voltage source $V_{DD}$. The gate voltage $V_G$ can be provided to the respective gates of the transistors 704-706 to drive the transistors 704-706, thereby coupling the drain to the source of each respective transistor 704-706 to establish the current path for current to flow to the ground 708. By coupling the drain to the source of the transistor 706 a biasing current $I_{BIAS2}$ can flow to the ground 708. Resultantly, the biasing voltage $N_{BIAS2}$ can be established at the transistor 706. In some examples, such as in examples wherein the bias current source circuit 700 corresponds to the bias current source 602, the transistor 706 can be coupled to the transistor 604. In these examples, the biasing current $I_{BIAS2}$ can correspond to the biasing current $I_{BIAS}$, as illustrated in FIG. 6. As such, the bias current $I_{BIAS2}$ can be represented by the following expression:

$$I_{BIAS2} = \frac{(V_S - V_{th})}{R}, \quad (2)$$

wherein $I_{BIAS2}$ is the biasing current, $V_{th}$ is a threshold voltage of the transistor 704, $V_S$ is the source voltage provided by the voltage source $V_{DD}$, and R is a resistance of the resistor 702.

Accordingly, the biasing currents $I_{BIAS1}$ and $I_{BIAS2}$ can be generated by respective biasing current source circuits of each corresponding biasing voltage circuit. As described herein, the biasing currents $I_{BIAS1}$ and $I_{BIAS2}$ and thus the bias voltages $N_{BIAS1}$ and $N_{BIAS2}$ provided by the respective biasing current source circuits can be combined to generate the biasing signals $N_{BIASMAIN}$, $P_{BIASMAIN}$, $N_{BIASTAP}$, and $P_{BIASTAP}$. By using a combination of the biasing currents $I_{BIAS1}$ and $I_{BIAS2}$ to provide the biasing signal can provide a constant time edge offset across various voltages (e.g., input signal voltages) and temperatures conditions).

As described herein, the biasing signals $N_{BIASMAIN}$, $P_{BIASMAIN}$, $N_{BIASTAP}$, and $P_{BIASTAP}$ can control a strength of time edge offset, such as being implemented by the time-based equalizer. In some examples, an amount of time edge offset (e.g., an amount in time, e.g., in picoseconds (ps)) that at least one edge of an input signal is to be shifted (e.g., by manipulating the at least one edge of the input signal) can be based on a DFE offset code. The DFE offset code can set the amount of DFE offset to compensate for ISI. As such, the DFE offset code can control the amount of equalization that the time-based equalizer is to apply to an input signal to compensate for ISI being caused by a corresponding communication channel between devices, for example, the memory controller 104 and the memory device 106, as illustrated in FIG. 1.

In some examples, the DFE offset code for the time-based equalizer can be determined by a DFE training algorithm. The DFE training algorithm can be implemented as a combination of logic and circuitry and can be employed to determine an effect that the corresponding communication channel (or previously received signals (e.g., bits)) have on a currently received signal (e.g., bit). Due to channel distortions in the corresponding communication channel, previously received signals can interfere (e.g., distort) the currently received signal. In some examples, the DFE training algorithm can be configured to determine prior to data transmission and/or reception (e.g., normal operation) along the corresponding communication channel, the effect that the corresponding communication channel has on transmitted signals. In other examples, the DFE training algorithm can be configured to determine at given time instances (e.g., periodically, at predetermined time slots, etc.) the distortion effect that the corresponding communication channel has on the currently received signal by the previously received signals.

By way of example, the DFE training algorithm can be configured to cause a training sequence $I_k$ to be provided on the corresponding communication channel. For example, the DFE training algorithm can be configured to cause each transmitter at a memory controller, such as the memory controller 104, to transmit the training sequence $I_k$ along a respective signal line of the data bus 110. The training sequence $I_k$ can include a known sequence of bits (e.g., 1's and 0's). The training sequence $I_k$ can be received at a corresponding receiver, such as the receiver 200, as illustrated in FIG. 2. In some examples, the training sequence $I_k$ can be provided to the time-based equalizer, such as the time-based DFE circuit 208, as illustrated in FIG. 2. The time-based equalizer can process received training sequence $I_k$ to provide an equalized output training sequence $I_{\tilde{k}}$. An error $E_k$ can be determined between the received training sequence $I_k$ and the equalized output training sequence $I_{\tilde{k}}$. The DFE training algorithm can be configured to use the determined error $E_k$ to update (e.g., set) the amount of timing offset that is to be implemented on received signals by the time-based equalizer, such that the time-based equalizer can be configured to provide a given amount of DFE offset, such that distortions caused by preceding received signals on a currently received signal can be mitigated (e.g., enable accurate detection of the received bit, as a one or zero, for example) by shifting respective edges of the input signal, as described herein.

Accordingly, the DFE training algorithm can set the DFE offset code corresponding to the amount of DFE offset for the time-based equalizer, such that the time-based equalizer can effectively mitigate effects caused by the corresponding communication channel on the received input signal. The DFE training algorithm can set (e.g., determine) the amount of DFE offset that is to be provided by the time-based equalizer by controlling the generation of the biasing signals $N_{BIASMAIN}$, $P_{BIASMAIN}$, $N_{BIASTAP}$, and $P_{BIASTAP}$. As an example, the DFE training algorithm can determine an amount of current being outputted by the biasing current source 602 by each of the first and second biasing voltage circuits 600 to set (e.g., an amplitude) the biasing signals $N_{BIASMAIN}$, $P_{BIASMAIN}$, $N_{BIASTAP}$, and $P_{BIASTAP}$.

FIG. 8 illustrates an example of a biasing signal generation circuit 800. The biasing signal generation circuit 800 can be configured to generate biasing signals $N_{BIASMAIN}$ and $P_{BIASMAIN}$ based on biasing voltages $N_{BIAS1}$ and $N_{BIAS2}$, such as provided by the first and second biasing voltage circuits, as described herein. As illustrated in FIG. 8, respective MPSRC FETs can be activated in response to a gate signal DACZ being applied at a MPSW FET. In some examples, the gate signal DACZ can be generated (e.g., by a controller) based on a determined DFE offset code, such as by the DFE training algorithm. In some examples, the biasing signal generation circuit 800 can include MNBIAS1MAIN and MNBIAS2MAIN FETs. Each of the MNBIAS1MAIN and MNBIAS2MAIN FETs can be configured to receive a corresponding biasing voltage $N_{BIAS1}$ and $N_{BIAS2}$, respectively. In response to activating the MPSRC FETs, and the biasing voltages $N_{BIAS1}$ and $N_{BIAS2}$ being provided at respective gates of the MNBIAS1MAIN and MNBIAS2MAIN FETs, the biasing signal $P_{BIASMAIN}$ can be established. As illustrated in FIG. 8, the biasing signal $P_{BIASMAIN}$ can be generated based on the corresponding voltages $N_{BIAS1}$ and $N_{BIAS2}$. In further examples, at least one of the MPSRC FETs can be coupled to a NBIASMAINOUT FET. In response to activating the at least one MPSRC FET, the NBIASMAINOUT FET can be configured to establish the biasing signal $N_{BIASMAIN}$. The biasing voltages $P_{BIASMAIN}$ and the $N_{BIASMAIN}$ can be supplied to a time-based equalizer, such as the time-based equalizer 136, as illustrated in FIG. 1 or the time-based DFE circuit 208, as illustrated in FIG. 2 to compensate for ISI effects. The biasing voltages $P_{BIASMAIN}$ and the $N_{BIASMAIN}$ can be supplied to a given delay cell of the time-based equalizer, such as one of the delay cells 302-306, as illustrated in FIG. 3. Thus, in some examples, each delay cell can be configured to receive corresponding biasing voltages $P_{BIASMAIN}$ and the $N_{BIASMAIN}$ from a respective biasing voltage driving circuit, such as the biasing signal generation circuit 800, as illustrated in FIG. 8.

FIG. 9 illustrates another example of a biasing signal generation circuit 900. The biasing signal generation circuit 900 can be configured to generate biasing signals $N_{BIASTAP}$ and $P_{BIASTAP}$ based on biasing voltages $N_{BIAS1}$ and $N_{BIAS2}$, such as provided by the first and second biasing voltage circuits, as described herein. As illustrated in FIG. 9, respective MPSRC FETs can be activated in response to a gate signal DACZ being applied at a MPSW FET of the biasing signal generation circuit 900. In some examples, the gate signal DACZ can be generated (e.g., by a controller) based on a determined DFE offset code, such as by the DFE training algorithm. In some examples, the biasing signal generation circuit 900 can include MNBIAS1TAP and MNBIAS2TAP FETs.

Each of the MNBIAS1TAP and MNBIAS2TAP FETs can be configured to receive a corresponding biasing voltage $N_{BIAS1}$ and $N_{BIAS2}$, respectively. In response to activating the MPSRC FETs, and the biasing voltages $N_{BIAS1}$ and $N_{BIAS2}$ being provided at respective gates of the MNBIAS1TAP and MNBIAS2TAP FETs, the biasing signal $N_{BIASTAP}$ can be established at a source of the MPSW FET. As illustrated in FIG. 9, the biasing signal $N_{BIASTAP}$ can be generated based on the corresponding voltages $N_{BIAS1}$ and $N_{BIAS2}$ according to the gate signal DACZ being applied at the MPSW FET. In some examples, the biasing signal generation circuit 900 can further include NBIASTAPOUT and PBIASTAPOUT FETs. The biasing signal $N_{BIASTAP}$ can be provided to gates of the NBIASTAPOUT and PBIASTAPOUT FET. In response to activating at least one MPSRC and the biasing signal being provided to the gates of the NBIASTAPOUT and PBIASTAPOUT FETs, respectively, a current path can be provided to establish the biasing signal $P_{BIASTAP}$. The biasing signals $N_{BIASTAP}$ and the $P_{BIASTAP}$ can be supplied to a time-based equalizer, such as the time-based equalizer 136, as illustrated in FIG. 1 or the time-based DFE circuit 208, as illustrated in FIG. 2 to compensate for ISI effects. The biasing signals $N_{BIASTAP}$ and the $P_{BIASTAP}$ can be supplied to a given delay cell of the time-based equalizer, such as one of the delay cells 302-306, as illustrated in FIG. 3. Thus, in some examples, each delay cell can be configured to receive corresponding biasing signals $N_{BIASTAP}$ and the $P_{BIASTAP}$ from a respective biasing voltage driving circuit, such as the biasing signal generation circuit 900, as illustrated in FIG. 9.

In some examples, the biasing voltages $P_{BIASMAIN}$ and $N_{BIASMAIN}$ can be determined based on the biasing current sources $I_{BIAS1}$ and $I_{BIAS2}$, and further based on FET characteristics. For example, an amount of biasing voltages $P_{BIASMAIN}$ and $N_{BIASMAIN}$ that can be generated by the biasing signal generation circuit 800 can be represented as follows:

$$\frac{aI_{BIAS1} + bI_{BIAS2}}{n + X} \tag{3}$$

wherein a is a ratio of MNBIAS1MAIN width to length ratio (W/L) to MNBIAS1, b is ratio of MNBIAS2MAIN W/L to MNBIAS2, $I_{BIAS1}$ is the biasing current provided by the first the first biasing voltage circuit, $I_{BIAS2}$ is the biasing current provided by the second biasing voltage circuit, n is a number of MPSRC FETs enabled (e.g., switched on), and X is the DFE offset code.

In some examples, the biasing voltages $P_{BIASTAP}$ and $N_{BIASTAP}$ can be determined based on the biasing current sources $I_{BIAS1}$ and $I_{BIAS2}$ and further based on characteristics of the FETs. For example, an amount of biasing voltages $P_{BIASTAP}$ and $N_{BIASTAP}$ that can be generated by the biasing signal generation circuit 900 can be represented as follows:

$$(cI_{BIAS1} + dI_{BIAS2}) \times X \tag{4}$$

wherein c is a ratio of MNBIAS1TAP W/L to MNBIAS1, d is ratio of MNBIAS2TAP W/L to MNBIAS2, $I_{BIAS1}$ is the biasing current provided by the first the first biasing voltage circuit 600, $I_{BIAS2}$ is the biasing current provided by the second biasing voltage circuit 600, and X the DFE offset code.

By way of example, a, b, c, d, n and X parameters with respect to expressions (3) and (4) can have the following values: a=12, b=20, c=22.5, d=12.0, n=40 and X=0 to 127.

Figure 10:
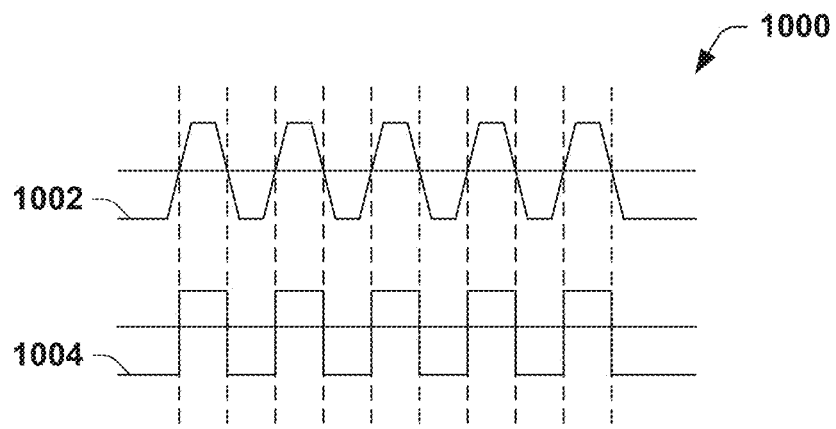
FIG. 10 illustrates an example of a diagram illustrating an effect of a zero timing offset.

FIG. 10 illustrates an example of a diagram 1000 illustrating an effect of a zero timing offset. The diagram 1000 can be associated with an operation of the time-based equalizer 136, as illustrated in FIG. 1 or the time-based DFE circuit 208, as illustrated in FIG. 2. Therefore, references can be made to the example of FIGS. 1-9. The diagram 1000 can include an input signal 1002 and an output signal 1004. By way of example, the zero-timing offset can be introduced in the input signal 1002 to provide the output signal 1004, as described herein. With zero timing offset, for example, the output signal 1004 can have a 50% duty cycle.

Figure 11:
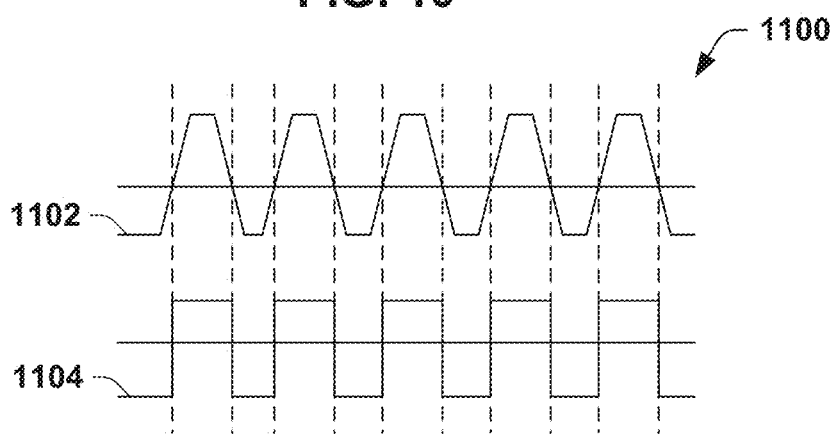
FIG. 11 illustrates an example of a diagram illustrating an effect of a negative timing offset.

FIG. 11 illustrates an example of a diagram 1100 illustrating an effect of a negative timing offset. The diagram 1100 can be associated with an operation of the time-based equalizer 136, as illustrated in FIG. 1 or the time-based DFE circuit 208, as illustrated in FIG. 2. Therefore, references can be made to the example of FIGS. 1-9. The diagram 1100 can include an input signal 1102 and an output signal 1104. By way of example, a negative timing offset can be introduced in the input signal 1102 to provide the output signal 1104, as described herein. The negative timing offset can cause a rising edge of the input signal 1102 to advance in time and a falling edge of the input signal 1102 to be delayed in time over a time interval for detecting the input signal to provide the output signal 1104. With negative timing offset, for example, the output signal 1104 can have a different duty cycle than the output signal 1004 generated by a given delay cell with respect to zero timing offset, as illustrated in FIG. 10.

Figure 12:
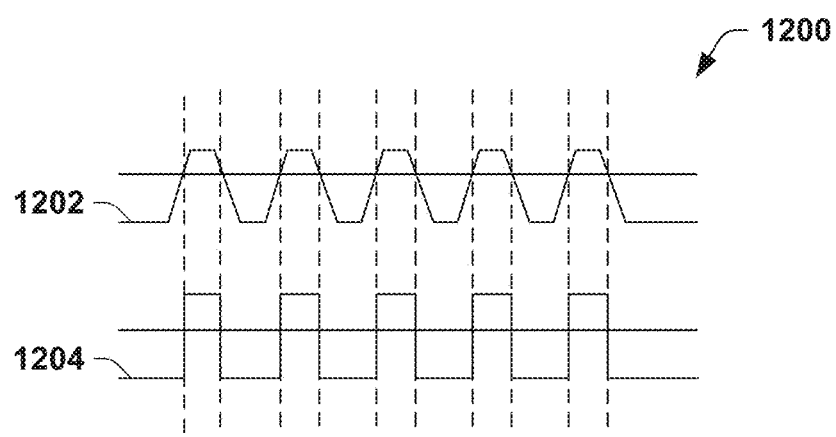
FIG. 12 illustrates an example of a diagram illustrating an effect of a positive timing offset.

FIG. 12 illustrates an example of a diagram 1200 illustrating an effect of a positive timing offset. The diagram 1200 can be associated with an operation of the time-based equalizer 136, as illustrated in FIG. 1 or the time-based DFE circuit 208, as illustrated in FIG. 2. Therefore, references can be made to the example of FIGS. 1-9. The diagram 1200 can include an input signal 1202 and an output signal 1204. By way of example, a positive timing offset can be introduced in the input signal 1202 to provide the output signal 1204. The positive timing offset can cause a rising edge of the input signal 1202 to be delayed in time and a falling edge of the input signal 1202 to be advanced in time to provide the output signal 1204. With positive timing offset, for example, the output signal 1204 can have a different duty cycle than the output signal 1004, as illustrated in FIG. 10 or the output signal 1104, as illustrated in FIG. 11.

Figure 13:
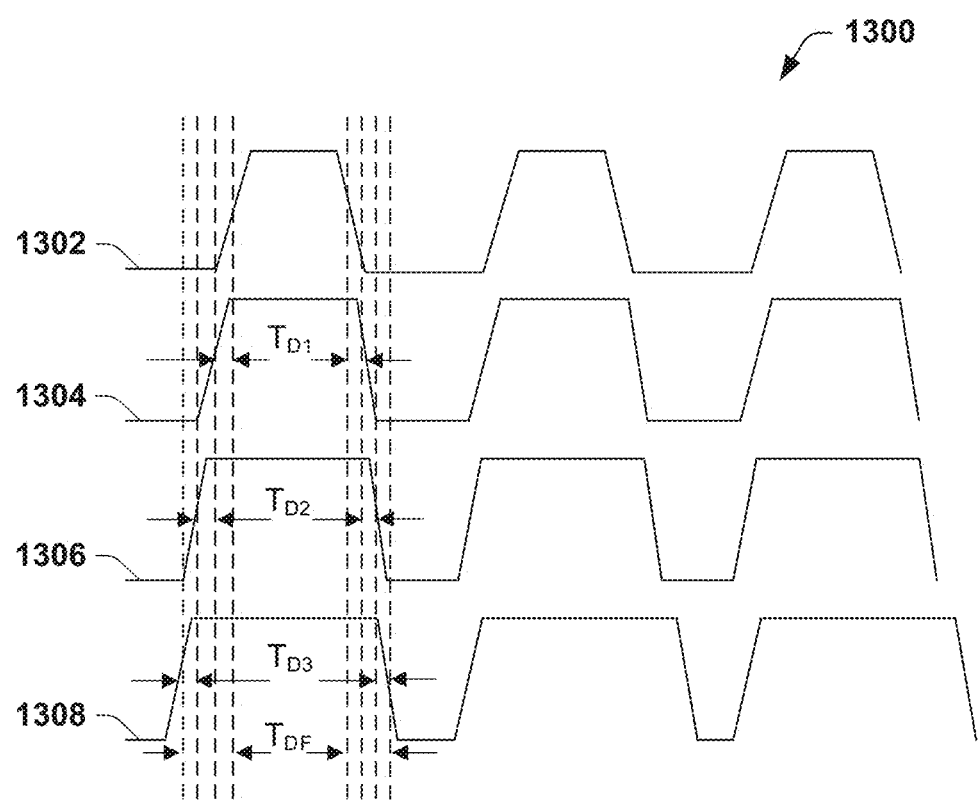
FIG. 13 illustrates an example of a diagram illustrating an effect of time edge shifting respective signal edges.

FIG. 13 illustrates an example of a diagram 1300 illustrating an effect of time edge shifting respective signal edges. In some examples, the time edge shifting can include a zero-timing offset, a positive timing offset and a negative timing offset. The diagram 1300 can be associated with an operation of the time-based equalizer 136, as illustrated in FIG. 1 or the time-based DFE circuit 208, as illustrated in FIG. 2. Therefore, references can be made to the example of FIGS. 1-9. The diagram 1300 can include an input signal 1302. In some examples, the time-based equalizer can include a first delay cell (e.g., the delay cell 302, as illustrated in FIG. 3), a second delay cell (e.g., the second delay cell 304, as illustrated in FIG. 3), and a third delay cell (e.g., the delay cell 306, as illustrated in FIG. 3). By way of example, each cell can be representative of tap and can be configured to receive the input signal 1302 and modulate each respective edge of the input signal (e.g., bit) to generate a respective output signal 1304-1308. As an example, each cell can be configured to modulate respective edges of the input signal 1302 by introducing one of the positive and negative timing offsets into the input signal 1302, as illustrated in FIG. 13. As described herein, outputs of each of the delay cells can be coupled, such that the output signals generated by each cell can be combined. In some examples, a summation circuit can be employed to combine the output signal from each of the delay cells to output a combined output signal.

By way of further example, the diagram 1300 can include a first output signal 1304. The first output signal 1304 can be provided by the first delay cell based on the input signal 1302. The first output signal 1304 can have a first-time delay $T_{D1}$. The first-time delay $T_{D1}$ can correspond to an amount of time that the respective edges of the input signal 1302 have been shifted by the first delay cell, as described herein. In some examples, the diagram 1300 can include a second output signal 1306. The second output signal 1306 can have a second time delay $T_{D2}$. The second time delay $T_{D2}$ can correspond to an amount of time that the respective edges of the input signal 1302 have been shifted by the second delay cell, as described herein. Thus, the second output signal 1306 can be representative of the effect that an edge delay at the first delay cell and an edge delay at the second delay cell can have on the input signal 1302. In some examples, the second delay cell can be configured to shift the respective edges of the input signal 1302 by a different amount of time than the first delay cell shifts the respective edges of the input signal 1302.

In some examples, the diagram 1300 can include a third output signal 1308. The third output signal 1308 can have a third time delay $T_{D3}$. The third time delay $T_{D3}$ can correspond to an amount of time that respective edges of the input signal 1302 have been shifted by the third delay cell, as described herein. Thus, the third output signal 1308 can be representative of the effect that an edge delay at the first delay cell, an edge delay at the second delay cell, and an edge delay at the third delay cell can have on the input signal 1302. In some examples, the third delay cell can be configured to shift the respective edges of the input signal 1302 by a different amount of time than the first delay cell and/or the second delay cell shifts the respective edges of the input signal 1302. Because each delay cell shifts the respective of the input signal 1302, and the output signals provided by each of the cells can be different (e.g., such as with respect to edge locations), in response to summing the output signals provided by each of the cells, the combined output signal resulting from the summing can have respective edges at edge time locations based on a total time delay $T_{DF}$ that can be a combination of the first, second and third time delays $T_{D1}$, $T_{D2}$ and $T_{D3}$.

Accordingly, each delay cell can be configured to introduce a timing offset to modify (e.g., modulate) respective edges of the input signal 1302 to provide modified input signals. The modified input signals can be combined to provide the combined output signal having respective edges located in time that can be based on an amount of time that the respective edges of the input signal 1302 have been shifted at corresponding delay cells.

Figure 14:
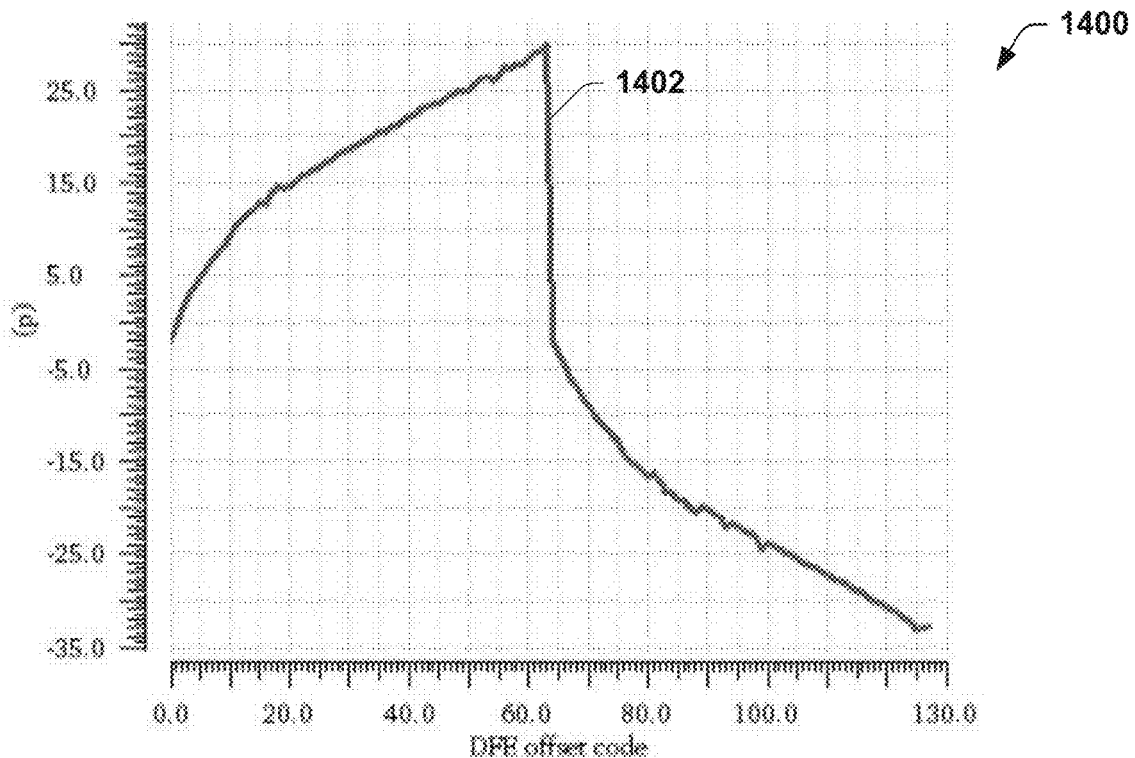
FIG. 14 illustrates an example of a diagram characterizing a positive timing offset of an input signal according to a DFE offset code.

FIG. 14 illustrates an example of a diagram 1400 characterizing a positive timing offset of an input signal according to a DFE offset code. The diagram 1400 can be associated with an operation of the time-based equalizer 136, as illustrated in FIG. 1 or the time-based DFE circuit 208, as illustrated in FIG. 2. Therefore, references can be made to the example of FIGS. 1-9. As illustrated in the example of FIG. 14, a y-axis of the diagram 1400 can represent a timing offset (e.g., an amount in time respective edges of an input signal are shifted) in picoseconds (ps) and an x-axis of the diagram 1400 can represent a DFE offset code in integer values. The diagram 1400 can characterize an example of DFE offset variation with DFE offset code with respect to the timing offset for respective edges of the input signal (e.g., the input signal 202, as illustrated in FIG. 2 or the input signal 308, as illustrated in FIG. 3). As described herein, the time-based equalizer can apply the positive timing offset to the input signal by delaying the rising edge of the input signal and advancing the falling edge of the input signal. In some examples, the DFE offset code can have a given binary code length (e.g., a bit string). For example, the DFE offset can be a 7-bit code and can be associated with an integer value in a range of 0-127. As such, in some examples, the DFE offset code be represented by an integer value in a given value range. A most significant bit (MSB) of the DFE offset code can specify a movement of a given edge of the input signal corresponding to a bit polarity (e.g., polarity signal, as described herein).

By way of example, the diagram 1400 can include an offset signal 1402. The offset signal 1402 can characterize delaying of the rising edge and advancing of the falling edge of the input signal over the given value range for the DFE offset code at a given delay cell (e.g., such as one of the delay cells 302-306, as illustrated in FIG. 1). Thus, the offset signal 1402 can characterize the positive timing offset for the input signal corresponding to delaying the rising edge and advancing the falling edge of the input signal by a given amount of time (e.g., in ps) at the given delay cell. The DFE offset code can be used to control operations (e.g., switching) of a given delay cell based on the biasing signals $N_{BIASMAIN}$, $P_{BIASMAIN}$, $N_{BIASTAP}$, and $P_{BIASTAP}$, as described herein. Thus, the DFE offset code can define (e.g., set) an amount of time offset corresponding to the positive timing offset that the given delay cell can apply to the input signal to shift in time the input signal. Thus, the timing offset can define a strength of DFE offset with respect to the input signal at the given delay cell.

In some examples, the MSB of the DFE offset code can specify a time polarity movement of a given edge of the input signal. For example, if the MSB of the DFE offset code is a 0 (e.g., the polarity signal or bit is 0), this can be indicative that the rising edge of the input signal is to have a positive rising edge movement. As illustrated with respect to FIG. 14, an amount of rising edge movement (in ps) with respect to the rising edge of the input signal can be a positive time value (e.g., having a time value in a range of about −1.5 ps to about 30.0 ps), such as illustrated by the offset signal 1402, and can have an upward slope between the DFE offset code in a value range of about 0 to about 63. Thus, if the MSB of the DFE offset code is set to 0, the rising edge of the input signal can have a positive time shift over a time interval for detecting the input signal.

In some examples, if the MSB of the DFE offset code is a 1 (e.g., the polarity signal or bit is a logical 1), this can be indicative that the falling edge of the input signal is to have a negative rising edge movement. As illustrated with respect to FIG. 14, an amount of falling edge movement (in ps) with respect to the falling edge of the input signal can be a negative time value (e.g., having a time value in a range of about −3.0 ps to about −34.0 ps), such as illustrated by the offset signal 1402 having a downward slope between the DFE offset code in a value range of about 64 to about 127. Thus, if the MSB of the DFE offset code is set to 1, the falling edge of the input signal can have a negative time shift over the given UI (e.g., bit period). In some examples, the rising edge and the falling edge of the input signal can have a similar edge movement with differing polarities, for example, as illustrated with respect to FIG. 15.

Accordingly, the DFE offset code can set the strength of the DFE offset (e.g., the amount of time that each edge of the input signal is to be shifted) and the time polarity movement (e.g., a polarity of the time movement) of each edge with respect to the input signal at the given delay cell. By employing a biasing scheme as described herein, positive timing offset can be applied to the input signal to provide for positive timing offset based on the DFE offset code, as described herein.

Figure 15:
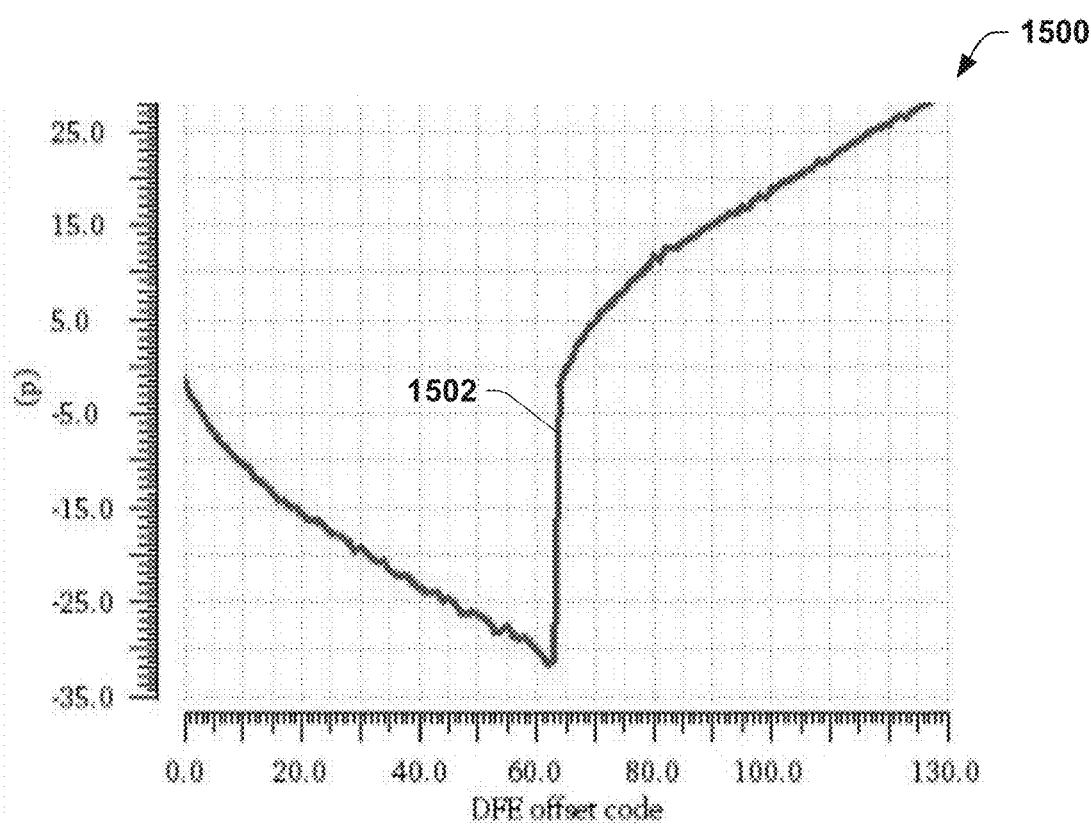
FIG. 15 illustrates an example of a diagram characterizing a negative timing offset of an input signal according to a DFE offset code

FIG. 15 illustrates an example of a diagram 1500 characterizing a negative timing offset of an input signal according to a DFE offset code. The diagram 1500 can be associated with an operation of the time-based equalizer 136, as illustrated in FIG. 1 or the time-based DFE circuit 208, as illustrated in FIG. 2. Therefore, references can be made to the example of FIGS. 1-9. As illustrated in the example of FIG. 15, a y-axis of the diagram 1500 can represent a timing offset in picoseconds (ps) and an x-axis of the diagram 1500 can represent a DFE offset code in integer values. The diagram 1500 can characterize an example of DFE offset variation with DFE offset code with respect to the timing offset for respective edges of the input signal (e.g., the input signal 202, as illustrated in FIG. 2 or the input signal 308, as illustrated in FIG. 3). As described herein, the time-based equalizer can apply the negative timing offset to the input signal by advancing a rising edge of the input signal and delaying a falling edge of the input signal.

By way of example, the diagram 1500 can include an offset signal 1502. The offset signal 1502 can characterize advancing of the rising edge and delaying of the falling edge of the input signal over the given value range for the DFE offset code at the given delay cell. Thus, the offset signal 1502 can characterize the negative timing offset for the input signal corresponding to advancing the rising edge and delaying the falling edge of the input signal by a given amount of time (e.g., in ps). The DFE offset code can be used to control operations (e.g., switching) of a given delay cell based on output biasing signals $N_{BIASMAIN}$, $P_{BIASMAIN}$, $N_{BIASTAP}$, and $P_{BIASTAP}$, as described herein. Thus, the DFE offset code can define (e.g., set) an amount of timing offset corresponding to the negative timing offset that the given delay cell of the time-based equalizer can apply to the input signal to shift in time the input signal. In some examples, the given delay cell can correspond to one of the delay cells 302-306, as illustrated in FIG. 3.

In some examples, the MSB of the DFE offset code can specify a time polarity movement of a given edge of the input signal. For example, if the MSB of the DFE offset code is a 0 (e.g., the polarity bit is 0), this can be indicative that the rising edge of the input signal is to have a negative rising edge movement. As illustrated with respect to FIG. 15, an amount of rising edge movement (in ps) with respect to the rising edge of the input signal can be a negative time value (e.g., having a time value in a range of about −1.0 ps to about 27.0 ps), such as illustrated by the offset signal 1502, and can have a downward slope between the DFE offset code in a value range of about 64 to about 127. Thus, if the MSB of the DFE offset code is set to 1, the falling edge of the input signal can have a negative time shift over a time interval for detecting the input signal.

In some examples, if the MSB of the DFE offset code is a 0 (e.g., the polarity bit is 0), this can be indicative that the falling edge of the input signal is to have a negative rising edge movement. As illustrated with respect to FIG. 15, an amount of positive edge movement (in ps) with respect to the falling edge of the input signal can be a positive time value (e.g., having a time value in a range of about −1.0 ps to about −32.0 ps), such as illustrated by the offset signal 1502 having an upward slope between the DFE offset code in a value range of about 0 to about 63. Thus, if the MSB of the DFE offset code is set to 1, the falling edge of the input signal can have a positive time shift over the given UI (e.g., bit period). In some examples, the rising edge and the falling edge of the input signal can have a similar edge movement with differing polarities, for example, as illustrated with respect to FIG. 15.

Accordingly, the DFE offset code can set the strength of the DFE offset (e.g., the amount of time that each edge of the input signal is to be shifted) and the time polarity movement (e.g., a polarity of the amount of time) of each edge with respect to the input signal at the given delay cell. By employing a biasing scheme as described herein, negative timing offset can be applied to the input signal to provide for negative timing offset based on the DFE offset code.

Figure 16:
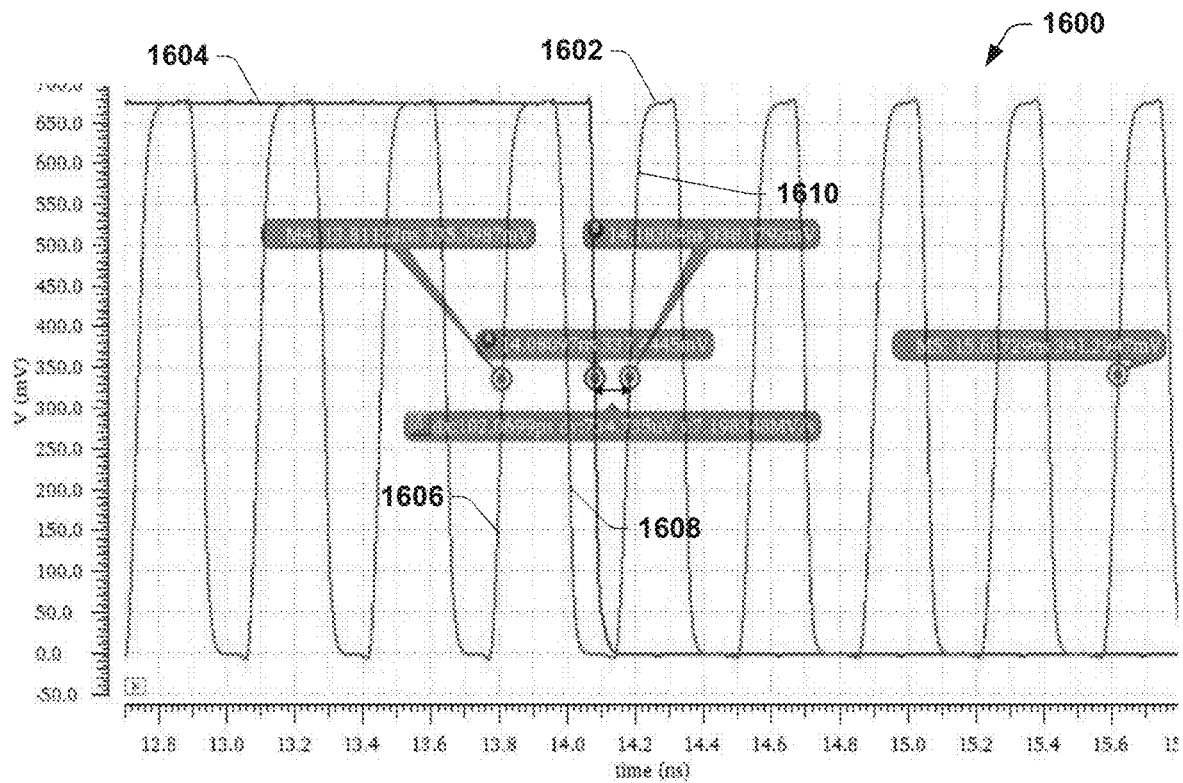
FIG. 16 illustrates an example of a diagram characterizing a rising edge movement of an input signal relative to a feedback signal.

FIG. 16 illustrates an example of a diagram 1600 characterizing a rising edge movement of an input signal relative to a feedback signal. The diagram 1600 can be associated with an operation of the time-based equalizer 136, as illustrated in FIG. 1 or the time-based DFE circuit 208, as illustrated in FIG. 2. Therefore, references can be made to the example of FIGS. 1-12. As illustrated in the example of FIG. 16, a y-axis of the diagram 1600 can represent a voltage in millivolts (mV) and an x-axis of the diagram 1600 can represent a time in nanoseconds (ns). In some examples, the diagram 1600 can include an input signal 1602. The input signal 1602 can correspond to the input signal 202, as illustrated in FIG. 2 or the input signal 308, as illustrated in FIG. 3.

By way of further example, the input signal 1602 can include at least one bit. In additional or alternative examples, each bit can have an associated bit period or a UI. The diagram 1600 illustrates a given bit 1602 of the input signal propagating from left to right in the diagram 1600 over a time window. By way of example, the bit can have an associated bit period of about 178.6 picoseconds (ps). Further, the diagram 1600 illustrates a feedback signal 1604 propagating from left to right in the diagram 1600 over the time window. The feedback signal 1604 can correspond to the feedback signal TAP_FB, as illustrated in FIGS. 4-5. In some examples, the feedback signal 1604 can be a previously determined received bit (e.g., the bit n−1). By way of further example, the feedback signal 1604 can correspond to one of the feedback signals 310-314, as illustrated in FIG. 3.

In some examples, for positive timing offset, a given delay cell (e.g., one of the delay cells 302-306, as illustrated in FIG. 3) of the time-based equalizer can be configured to delay a rising edge of the bit and advance a falling edge of the bit. As described herein, the positive timing offset can be implemented with respect to the input signal by the given delay cell based on a DFE offset code and a feedback bit, such as the feedback bit 1604, as illustrated in FIG. 16. The DFE offset code can specify an edge polarity movement of a given edge of the input signal (e.g., whether the given edge of the input signal is to have a positive time shift or a negative time in time relative to an initial edge time location), and an edge strength movement of the given edge of the input signal (e.g., an amount in time relative to the initial edge time location that the given edge of the input signal is to be shifted). As described herein, biasing signals $N_{BIASMAIN}$, $P_{BIASMAIN}$, $N_{BIASTAP}$, and $P_{BIASTAP}$, can be generated based on the DFE offset code and employed to control operations (e.g., switching operations) of the given delay to implement edge shifting of the given edge of the input signal. The feedback bit can control when in time to implement the edge shifting of the given edge. With respect to the positive timing offset, for purposes of clarity and brevity, the diagram 1600 illustrates an example of delaying the rising edge 1606 of the bit 1602.

By way of example, to delay a rising edge 1606 of the bit 1602 and advance a falling edge 1608 of the bit 1602 over the time window, the given delay cell can be configured to delay the rising edge 1606 and advance the falling edge 1608 of the bit 1602 according to the feedback bit 1604. As an example, in response to the feedback bit 1604 having a high value (e.g., a logical value corresponding to one, in some examples, around about 675 mV, as illustrated in FIG. 16) during a given period of time over the time window, the rising edge 1606 of the bit 1602 can have an initial rising edge time location, such as with respect to an initial falling edge time location of the falling edge 1608 of the bit 1602 over the associated bit period (e.g., 178.6 ps) for the bit 1602. For example, the initial rising edge time location can be at about 13.81122 ns in the associated bit period, such as illustrated in FIG. 16.

In some examples, the feedback bit 1604 can transition from the high value to a low value (e.g., a logical value corresponding to zero, in some examples, around 0 mV, as illustrated in FIG. 16) for a remainder of the time window. In the example of FIG. 16, the feedback bit 1604 is configured to transition at about 14.08097 ns from the high value to the low value and this time location can be referred to as a transition edge time location. Once the feedback bit 1604 has the low value, the rising edge 1606 of the bit 1602 can be delayed, such that the rising edge 1606 can have a new rising edge time location, such as with respect to the initial rising edge time location over the associated bit period. The rising edge 1606 of the bit 1602 that has been delayed can be referred to as a delayed rising edge 1610. For example, the new rising edge time location can be at about 14.1830 ns, such as illustrated in FIG. 16. As such, the given delay cell can be configured to delay the rising edge 1606 of the bit 1602 by an amount of time within the associated bit period in response to the feedback bit 1604 switching to the low value (e.g., zero). The amount of time that the rising edge 1606 is delayed over the bit period can be referred to as a rising edge time delay amount.

Although not illustrated with respect to the example of FIG. 16, the falling edge 1608 of the bit 1602 can be advanced to a new falling edge time location relative to the initial falling edge time location over the bit period based on the offset code and the feedback bit 1604. The falling edge 1608 of the bit 1602 that has been delayed can be referred to as an advanced falling edge. As such, the given delay cell can be configured to advance the falling edge 1608 of the bit 1602 by an amount of time within the associated bit period in response to the feedback bit 1604 switching to the low value (e.g., zero). The amount of time that the falling edge 1608 is delayed over the bit period can be referred to as a falling edge time delay amount. In some examples, the falling edge time delay amount is equal to the rising edge time delay amount. By way of further example, a modified bit (e.g., the bit 1602) can be propagated to a sampling circuit (e.g., the sampler circuit 216, as illustrated in FIG. 2) from the given delay cell. In some examples, the sampling circuit can be configured to provide the modified bit to a receiver output. In an example, the receiver output can be coupled to a decision device. The decision device can include any device capable of analyzing the bit 1602 at particular points in time and quantizing the bit 1602 (e.g., the received signal) to distinct values.

In some examples, the bit 1602 having the delayed rising edge 1608 can be measured at a final rising edge time location $F_{RETL}$ (e.g., at about 15.6173 ns over the time window, as illustrated in FIG. 16). A final amount of rising edge movement $F_{REM}$ between the final rising edge time location $F_{RETL}$ and the initial rising edge time location $I_{RETL}$ can be determined according to the following expression:

$$F_{REM}=(F_{RETL}-I_{RETL})\text{mod}(B_p) \qquad (5),$$

wherein $F_{RETL}$ is the final rising edge time location, $I_{RETL}$ is the initial rising edge time location, $B_p$ is the associated bit period, and $F_{REM}$ is the final amount of rising edge movement.

In the example of FIG. 16, the final amount of rising edge movement $F_{REM}$ between the final rising edge time location $F_{RETL}$ and the initial rising edge time location $I_{RETL}$ is about 20.4 ps (e.g., $F_{REM}$=20.4 ps=15.6173 ns-13.8112 ns mod (178. ps)).

In some examples, an amount of edge tap reference movement $E_{TRM}$ can be determined according to the following expression:

$$E_{TRM}=N_{RETL}-I_{RETL}\text{ mod}(B_p) \qquad (6),$$

wherein $N_{RETL}$ is the new rising edge time location for the delayed rising edge 1610, $I_{RETL}$ is the initial rising edge time location for the rising edge 1606, $B_p$ is the associated bit period, and $E_{TRM}$ is the amount of edge tap reference movement $E_{TRM}$.

In the example of FIG. 16, an amount of edge tap reference movement $E_{TRM}$ between the new rising edge time location $N_{RETL}$ for the delayed rising edge 1610 and the initial rising edge time location $I_{RETL}$ is about 14.7 ps (e.g., $E_{TRM}$=14.7 ps=14.1830 ns-13.8112 ns mod(178. ps)).

A settling percentage of DFE offset $S_\%$ from feedback bit to the receiver output can be determined according to the following expression:

$$S_\% = \frac{E_{TRM}}{F_{REM}} \times 100\%, \quad (7)$$

In the example of FIG. 16, the settling percentage of the timing offset $S_\%$ from feedback bit to the receiver output can be about 72% (e.g., $$S_\% = 72\% = \frac{14.7 \text{ ps}}{20.4 \text{ ps}} \times 100\%).$$

In some examples, a feedback loop delay $F_{LD}$ (e.g., an amount of time between receiving the feedback bit at the time-based equalizer (e.g., the given delay cell)) and the input signal (e.g., the modified bit 1602) for a receiver employing the time-based equalizer, as described herein, can be determined according to the following expression:

$$F_{LD}=N_{RETL}-T_{RETL}, \quad (8)$$

wherein the $T_{RETL}$ is the transition edge time location, the $N_{RETL}$ is the new rising edge time location, and $F_{LD}$ is the feedback loop delay.

In the example of FIG. 16, the feedback loop delay $F_{LD}$ is about 102 ps (e.g., $F_{LD}$=102 ps=14.08907 ns-14.18304 ns).

Accordingly, in contrast to receivers employing voltage-based DFE, the time-based equalizer can settle from feedback bit to output at a higher timing margin. In some examples, voltage-based DFE receivers have a DFE feedback time for the receiver to settle from the feedback bit to the receiver at about 180 ps for about a 50% settling percentage of the timing offset $S_\%$. In contrast, receivers configured with the time-based equalizer described herein, for example, as presented with respect to FIG. 16, can have a DFE feedback time for the receiver to settle from the feedback bit to the receiver at about 102 ps for about a 72% settling percentage of the DFE offset $S_\%$.

Figure 17:
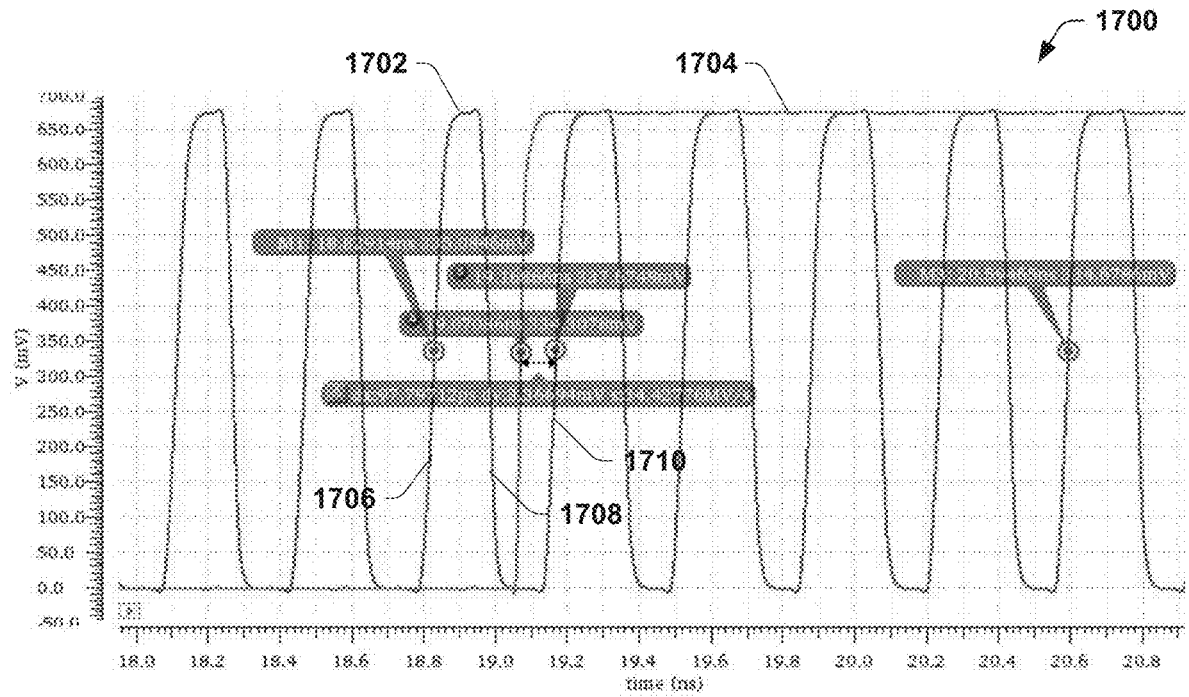
FIG. 17 illustrates another example of a diagram characterizing a rising edge movement of an input signal relative to a feedback signal.

FIG. 17 illustrates another example of a diagram 1700 characterizing a rising edge movement of an input signal relative to a feedback signal. The diagram 1700 can be associated with an operation of the time-based equalizer 136, as illustrated in FIG. 1 or the time-based DFE circuit 208, as illustrated in FIG. 2. Therefore, references can be made to the example of FIGS. 1-12. As illustrated in the example of FIG. 17, a y-axis of the diagram 1700 can represent a voltage in millivolts (mV) and an x-axis of the diagram 1700 can represent a time in nanoseconds (ns). The diagram 1700 can include an input signal 1702. The input signal 1702 can correspond to the input signal 202, as illustrated in FIG. 2 or the input signal 308, as illustrated in FIG. 3.

By way of further example, the input signal 1702 can include at least one bit. In additional or alternative examples, each bit can have an associated bit period or a UI. In some examples, the diagram 1700 illustrates a given bit 1702 of the input signal propagating from left to right in the diagram 1700 over a time window. By way of example, the bit can have an associated bit period of about 178.6 picoseconds (ps). Further, the diagram 1700 illustrates a feedback signal 1704 propagating from left to right in the diagram 1700 over the time window. The feedback signal 1704 can correspond to the feedback signal TAP_FB, as illustrated in FIGS. 4-5. In some examples, the feedback signal 1704 is a previously determined received bit (e.g., the bit n−1). In further examples, the feedback signal 1704 can correspond to one of the feedback signals 310-314, as illustrated in FIG. 3.

In some examples, for negative timing offset, a given delay cell (e.g., one of the delay cells 302-306, as illustrated in FIG. 3) of the time-based equalizer can be configured to advance a rising edge of the bit and delay a falling edge of the bit. As described herein, the negative timing offset can be implemented with respect to the input signal by the given delay cell based on a DFE offset code and a feedback bit, such as the feedback bit 1704, as illustrated in FIG. 17. The DFE offset code can specify an edge polarity movement of a given edge of the input signal (e.g., whether the given edge of the input signal is to have a positive time shift or a negative time in time relative to an initial edge time location), and an edge strength movement of the given edge of the input signal (e.g., an amount in time relative to the initial edge time location that the given edge of the input signal is to be shifted). As described herein, biasing signals $N_{BIASMAIN}$, $P_{BIASMAIN}$, $N_{BIASTAP}$, and $P_{BIASTAP}$, can be generated based on the DFE offset code and employed to control operations (e.g., switching operations) of the given delay to implement edge shifting of the given edge of the input signal. The feedback bit 1704 can control when in time to implement the edge shifting of the given edge. With respect to the negative timing offset, for purposes of clarity and brevity, the diagram 1700 illustrates an example of advancing a rising edge 1706 of the bit 1702.

By way of example, to advance the rising edge 1706 of the bit 1702 and delay a falling edge 1708 of the bit 1702 over the time window, the given delay cell can be configured to advance the rising edge 1706 of the bit 1702 and delay the falling edge 1708 of the bit 1702 according to the feedback bit 1704. As an example, in response to the feedback bit 1704 having a low value (e.g., a logical value corresponding to zero, in some examples, around about 0 mV, as illustrated in FIG. 17) for a given period of time of the time window, the rising edge 1706 of the bit 1702 can have an initial rising edge time location, such as with respect to an initial falling edge time location of the falling edge 1708 of the bit 1702 over the associated bit period (e.g., 178.6 ps) for the bit 1702. For example, the initial rising edge time location can be at about 18.82914 ns in the associated bit period, such as illustrated in FIG. 17.

In some examples, the feedback bit 1704 can transition from the low value to a high value (e.g., a logical value corresponding to a one, in some examples, around 650 mV, as illustrated in FIG. 17) for a remainder of the time window. In the example of FIG. 17, the feedback bit 1704 can be configured to transition at about 19.07086 ns from the low value to the high value and this time location can be referred to as a transition edge time location. Once the feedback bit 1704 has the high value, the rising edge 1706 of the bit 1702 can be advanced, such that the rising edge 1706 can have a new rising edge time location, such as with respect to the initial rising edge time location over the associated bit period. The rising edge 1706 of the bit 1702 that has been advanced can be referred to as an advanced rising edge 1710. For example, the new rising edge time location can be at about 19.1687 ns, such as illustrated in FIG. 17. As such, the given delay cell can be configured to advance the rising edge 1706 of the bit 1702 by an amount of time within the associated bit period in response to the feedback bit 1704 switching to the high value. The amount of time that the rising edge 1706 is advanced over the bit period can be referred to as a rising edge time advance amount.

Although not illustrated with respect to the example of FIG. 17, the falling edge 1708 of the bit 1702 can be delayed to a new falling edge time location relative to the initial falling edge time location over the bit period based on the DFE offset code and the feedback bit 1704. The delayed falling edge of the bit 1702 that has been delayed can be referred to as a delayed falling edge. As such, the given delay cell can be configured to delay the falling edge of the bit 1702 by an amount of time within the associated bit period in response to the feedback bit 1704 switching to the high value (e.g., one). The amount of time that the falling edge is delayed over the bit period can be referred to as a falling edge time delay amount. In some examples, the falling edge time delay amount is equal to the rising edge time advance amount. By way of further example, a modified bit (e.g., the bit 1702 having the advanced rising edge 1710 and delayed falling edge) can be propagated to a sampling circuit from the given delay cell. In some examples, the sampling circuit can be configured to provide the modified bit to a receiver output. In an example, the receiver output can be coupled to a decision device. The decision device can include any device capable of analyzing the bit at particular points in time and quantizing the bit (e.g., the received signal) to distinct values.

In some examples, the bit 1702 having the advanced rising edge can be provided at the receiver output at a final rising edge time location $F_{RETL}$. A final amount of rising edge movement $F_{REM}$ between the final rising edge time location $F_{RETL}$ and the initial rising edge time location $I_{RETL}$ can be determined according to expression (5).

In the example of FIG. 17, the final amount of rising edge movement $F_{REM}$ between the final rising edge time location $F_{RETL}$ and the initial rising edge time location $I_{RETL}$ is about −20.2 ps (e.g., $F_{REM}$=−20.2 ps=20.5947 ns-18.8291 ns mod (178. ps)).

In some examples, an amount of edge tap reference movement $E_{TRM}$ can be determined according to expression (6). In the example of FIG. 17, the amount of edge tap reference movement $E_{TRM}$ between the new rising edge time location $N_{RETL}$ and the initial rising edge time location $I_{RETL}$ is about −17.6 ps (e.g., $E_{TRM}$=−17.6 ps=19.1687 ns-18.8291 ns mod(178. ps)).

Figure 18:
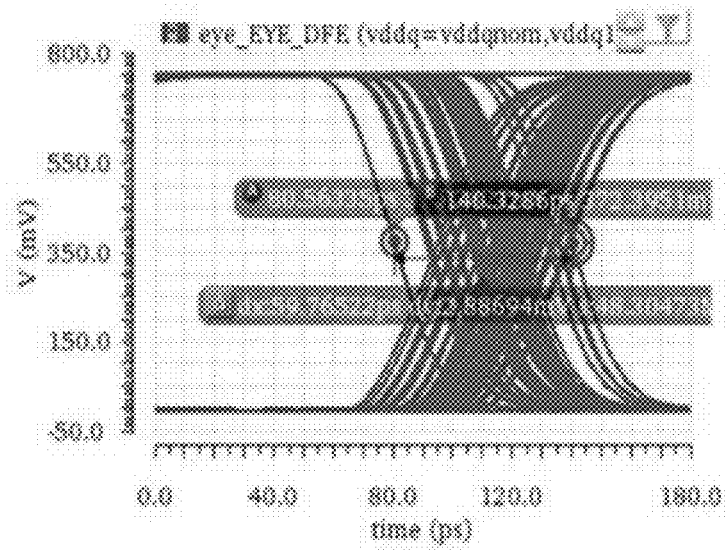
FIG. 18 illustrates an example of an eye diagram.

A settling percentage of timing offset $S_{\%}$ from feedback bit to the receiver output can be determined according to expression (7). In the example of FIG. 18, the settling percentage of the timing offset $S_{\%}$ from feedback bit to the receiver output can be about 87.1% (e.g., $$S_\% = 87.1\% = \frac{-17.6 \text{ ps}}{-20.2 \text{ ps}} \times 100\%).$$

In some examples, a feedback loop delay $F_{LD}$ (e.g., an amount of time between receiving the feedback bit at the time-based equalizer (e.g., the given delay cell) and the input signal (e.g., the modified bit) for a receiver employing the time-based equalizer, as described herein, can be determined according to expression (8). In the example of FIG. 17, the feedback loop delay $F_{LD}$ can be about 97.8 ps (e.g., $F_{LD}$=97.8 ps=19.07086 ns-19.16866 ns).

Accordingly, in contrast to receivers employing voltage-based DFE, the time-based equalizer can settle from feedback bit to output at a higher timing margin. In some examples, voltage-based DFE receivers have a DFE feedback time for the receiver to settle from the feedback bit to the receiver at about 180 ps for about a 50% settling percentage of the timing offset $S_{\%}$. In contrast, receivers configured with the time-based equalizer described herein, for example, as presented with respect to FIG. 17, can have a DFE feedback time for the receiver to settle from the feedback bit to the receiver at about 97.8 ps for about an 87.1% settling percentage of the timing offset $S_{\%}$.

In some examples, the time-based equalizer can include a plurality of delay cells, such as at least two delay cells of the plurality of delays cells 302-306, as illustrated in FIG. 3. In these examples, a first delay cell can be configured to implement positive DFE offset. By way of further example, the first delay cell can correspond to the given delay cell described herein with respect to the example of FIG. 16. A second delay cell of the at least two delay cells can be configured to implement a negative DFE offset. By way of further example, the second delay cell can correspond to the given delay cell described herein with respect to the example of FIG. 16. As such, the time-based equalizer employing the first and second delay cell can have a first a feedback loop delay for the first delay cell, and a second feedback loop delay for the second delay cell. The first feedback loop delay can characterize an amount of time between receiving the DFE feedback bit (e.g., the bit n−1) at the first delay cell and receiving the modified bit at the output of the receiver. Thus, in some examples, the first feedback loop delay can be about 102 ps, such as described with respect to example of FIG. 16. The second feedback loop delay can characterize an amount of time between receiving the feedback bit (e.g., the bit n−1) at the second delay cell and receiving the modified bit at the output of the receiver. Thus, in some examples, the second feedback loop delay can be about 97.8 ps, such as described with respect to example of FIG. 17. Because the first feedback loop delay is greater than the second feedback loop delay, an overall feedback loop delay for the time-based equalizer can be based on the first feedback loop delay. As such, an overall settling percentage of the timing offset for the receiver can be indicated by the first feedback loop delay. For example, since the settling percentage of the timing offset of the first feedback loop delay in the example of FIG. 16 can be about 72% and the settling percentage of the timing offset of the second feedback loop delay is about 87.1% in the example of FIG. 17, the overall settling percentage of the DFE offset for the receiver can be about 72%.

FIG. 18 illustrates an example of an eye diagram 1800. The eye diagram 1800 can be associated with an operation of a receiver employing a time-based DFE, such as the receiver 200, as illustrated in FIG. 2. As illustrated in the example of FIG. 18, a y-axis of the eye diagram 1800 can represent a voltage in millivolts (mV) and an x-axis of the eye diagram 1800 can represent a time in picoseconds (ps). The eye diagram 1800 can characterize a performance (e.g., signal quality) of signals outputted by the receiver. In some examples, the eye diagram 1800 can be associated with a receiver employing a voltage-based DFE having one tap of unrolled DFE applied, such as at the front-end circuit 204, as illustrated in FIG. 2. As illustrated by the eye diagram 1800, a timing error (e.g., jitter) can be about 59.6 ps.

Figure 19:
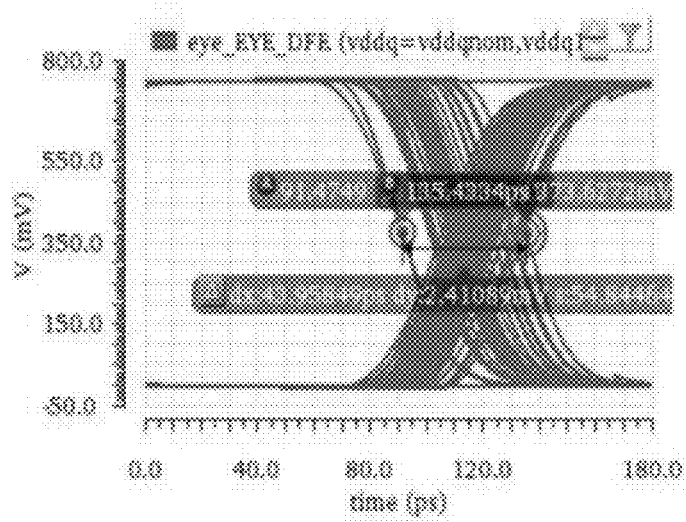
FIG. 19 illustrates another example of an eye diagram.

FIG. 19 illustrates example of another eye diagram 1900. The eye diagram 1900 can be associated with an operation of the time-based equalizer 136, as illustrated in FIG. 1 or the time-based DFE circuit 208, as illustrated in FIG. 2. Therefore, references can be made to the example of FIGS. 1-9. As illustrated in the example of FIG. 19, a y-axis of the eye diagram 1900 can represent a voltage in millivolts (mV) and an x-axis of the eye diagram 1900 can represent a time in picoseconds (ps). The eye diagram 1900 can characterize a performance (e.g., signal quality) of signals outputted by the receiver, such as the receiver 200, as illustrated in FIG. 2. In some examples, the eye diagram 1900 can be associated with a receiver employing one tap of unrolled voltage DFE, such as the front-end circuit 204, as illustrated in FIG. 2. As illustrated by the eye diagram 1900, a timing error (e.g., jitter) can be about 43.9 ps. Accordingly, by employing the receiver with the time-based equalizer as described herein jitters in the receiver can be reduced.

Accordingly, by implementing receivers with the time-based equalizer herein, such as described herein, for multiple taps of DFE (e.g., for a three tap DFE), a small chip surface area can be used. In some examples, the time-based equalizer, such as described herein, can be implemented to provide rolled DFE by shifting the input signal in time. As such, for DDR channels signals voltage may be not needed. The time-based equalizer can be configured to maximize a timing window, rather than indirectly on the voltage slicing level, as in voltage-based DFE receivers. The time-based equalizer described herein can be used to lower loss high reflection in DDR and device-to-device (D2D) applications. Moreover, by employing the output voltage biasing technique described herein, the time-based equalizer can have a relatively low variation with voltage and temperature. Thus, the DFE offset can be linear with the DFE code despite the nonlinear nature of a delay circuit. Moreover, employing a dummy load, such as in a given delay cell, with the corresponding logic described herein can achieve equal rising and falling edge movements.

Figure 20:
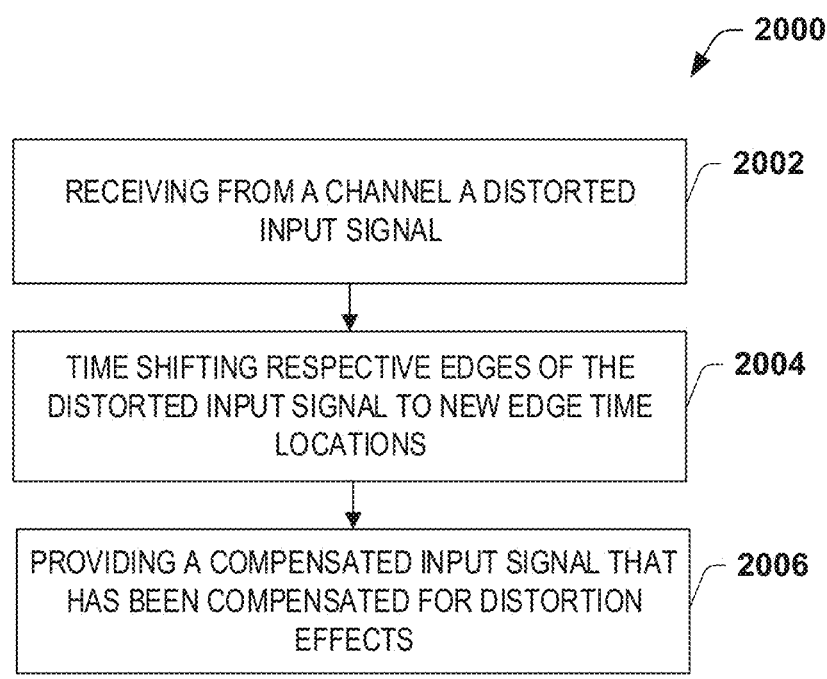
FIG. 20 illustrates an example of a method for time-based decision feedback equalization.

In view of the foregoing structural and functional features described above, example methods will be better appreciated with references to FIG. 20. While, for purposes of simplicity of explanation, the example method of FIG. 20 is shown and described as executing serially, it is to be understood and appreciated that the example method is not limited by the illustrated order, as some actions could in other examples occur in different orders, multiple times and/or concurrently from that shown and described herein.

FIG. 20 illustrates an example of a method 2000 for time-based decision feedback equalization. The method 2000 can be implemented by a time-based equalizer, such as the time-based equalizer 136, as illustrated in FIG. 1 or the time-based DFE circuit 208, as illustrated in FIG. 2. Therefore, references can be made to the example of FIGS. 1-19. The method 2000 can begin at 2002, by receiving from a channel an input signal having distortions caused by previously received input signals received from the channel. At 2004, edges of multiple instances of the received input signal can be shifted in time from initial edge time locations to new edge time locations over a time interval for detecting the input signal to generate time-edge shifted input signals. Each time-edge shifted input signal compensates for ISI effects that a given previously received input signal has on the input signal. At 2006, the time-edge shifted input signals can be combined to provide a compensated signal. The compensated signal is an edge-modulated version of the input signal that has been offset for the ISI effects.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A time-based equalizer coupled to a channel to receive an input signal, the time-based equalizer comprising:
   a plurality of delay cells, each delay cell being configured to receive the input signal and time shift edges of the received input signal from initial edge time locations to new edge time locations over a time interval for detecting the input signal to generate time-edge shifted input signals, wherein each time-edge shifted input signal compensates for distortion effects that a given previously received input signal has on the input signal; and
   a summation circuit configured to combine the time-edge shifted input signals to provide a compensated signal, wherein the compensated signal is an edge-modulated version of the input signal that has been offset for intersymbol interference (ISI) effects caused by each previously received input signal on the input signal.

2. The time-based equalizer of claim 1, wherein a given delay cell of the plurality of delay cells is configured to shift in time the edges of the received input signal based on a feedback signal and edge movement signals, the feedback signal being generated based on the given previously received input signal that distorts the received input signal.

3. The time-based equalizer of claim 2, wherein the edge movement signals comprise edge strength shift signals and a polarity time shift signal, the given delay cell being configured to shift by a given amount of time the edges of the received input signal from the initial edge time locations to the new edge time locations over the time interval based on the edge strength shift signals according to the polarity time shift signal and the feedback signal.

4. The time-based equalizer of claim 3, wherein the given delay cell is configured to shift by the given amount of time each edge of the received input signal in a forward time direction or a reverse time direction over the time interval relative to an initial edge time location of each edge based on the polarity time shift signal.

5. The time-based equalizer of claim 4, wherein the given delay cell is configured to implement one of:
   a negative timing offset with respect to the received input signal by advancing a rising edge of the received input signal from an initial rising edge time location to a new rising edge time location over the time interval for the input signal received at the given delay cell, and delaying a falling edge of the received input signal from an initial falling edge time location to a new falling edge time location for the input signal received at the given delay cell based on the feedback signal, the edge strength shift signals, and the polarity time shift signal, and
   a positive timing offset with respect to the received input signal by delaying the rising edge of the received input signal from the initial rising edge time location to the new rising edge time location over the time interval for the input signal received at the given delay cell, and advancing the falling edge of the received input signal from the initial falling edge time location to the new falling edge time location for the input signal received at the given delay cell based on the feedback signal, the edge strength shift signals and the polarity time shift signal.

6. The time-based equalizer of claim 5, wherein:
the given delay cell is a first delay cell and the edge movement signals is a first set of edge movement signals, the plurality of delay cells comprise a second delay cell, the feedback signal is a first feedback signal and the edge strength shift signals are a first set of edge strength shift signals and the polarity time shift signal is a first polarity time shift signal, and
the second delay cell is configured to implement one of the positive timing offset and the negative timing offset with respect to the received input signal received by one of delaying or advancing a rising edge of the received input signal from an initial rising edge time location to a new rising edge time location over the time interval for the input signal received at the second delay cell, and advancing or delaying a falling edge of the respective input signal from an initial falling edge time location to a new falling edge time location for the input signal received at the second delay cell based on a second feedback signal and a second set of edge strength shift signals and a second polarity time shift signal, the second set of edge strength shift signals and the second polarity time shift signal defining a second set of edge movement signals.

7. The time-based equalizer of claim 5, wherein the given delay cell comprises a main branch and a tap branch each comprising a plurality of field effect transistors (FETs), wherein the edge strength shift signals comprise biasing signals $P_{BIASMAIN}$, $N_{BIASMAIN}$, $P_{BIASTAP}$ and $N_{BIASTAP}$, the FETs of the main branch being configured to control an amount of current through the main branch based on the biasing signals $P_{BIASMAIN}$ and $N_{BIASMAIN}$, and the FETs of the tap branch being configured to control an amount of current through the tap branch based on the biasing signals $P_{BIASTAP}$ and $N_{BIASTAP}$, the feedback signal, and the polarity time shift signal, the amount of current through each respective branch controlling the shift in time of the edges of the received input signal.

8. The time-based equalizer of claim 7, wherein the tap branch comprises a plurality of dummy loads to balance an amount of delay when the biasing signals $N_{BIASTAP}$ and $P_{BIASTAP}$ are off and allow for symmetric rising and falling delays with respect to the edges of the input signal.

9. The time-based equalizer of claim 8, wherein the time-based equalizer is implemented at a receiver coupled to a channel to receive the input signal, the receiver further comprising a front-end circuit configured to receive the input signal from the channel and amplify the input signal, each of the plurality of delay cells being configured to receive the amplified input signal for ISI compensation.

10. The time-based equalizer of claim 9, wherein the front-end circuit comprises a voltage-based equalizer, the voltage-based equalizer circuit being configured to partially compensate for the distortion effects that the given previously received input signal has on the input signal, the time-based equalizer being configured to further compensate for the distortion effects in the amplified input signal caused by the given previously received input signal based on the feedback signal and the edge movement signals.

11. A receiver coupled to a channel to receive input signals, the receiver comprising:
a front-end circuit configured to receive an input signal from the channel and amplify the input signal; and
a time-based decision feedback equalizer (DFE) circuit configured to receive the amplified input signal and compensate for distortions in the amplified input signal caused by at least one previously received input signal to provide an intersymbol interference (ISI) compensated input signal, wherein the time-based DFE circuit is configured to compensate for the distortions by edge time shifting respective edges of the input signal in time over a time interval for detecting the input signal to new edge time locations based on a feedback signal and edge movement signals, the feedback signal being generated based on the at least one previously received input signal.

12. The receiver of claim 11, wherein the time-based DFE circuit is configured to one of advance or delay the respective edges of the input signal from respective initial edge time locations to the new edge time locations over the time interval based on the feedback signal and the edge movement signals.

13. The receiver of claim 12, wherein the time-based DFE circuit is configured to advance a rising edge of the input signal in time from an initial rising edge time location to a new rising edge time location over the time interval, and delay a falling edge of the input signal in time from an initial falling edge time location to a new falling edge time location over the time interval based on the feedback signal and the edge movement signals.

14. The receiver of claim 13, wherein a difference in time between the initial rising edge time location and the new rising edge time location is equal to a difference in time between the initial falling edge time location and the new falling edge time location.

15. The receiver of claim 12, wherein the time-based DFE circuit is configured to delay a rising edge of the input signal in time from an initial rising edge time location to a new rising edge time location over the time interval, and advance a falling edge of the input signal in time from an initial falling edge time location to a new falling edge time location over the time interval based on the feedback signal and the edge movement signals.

16. The receiver of claim 11, wherein the front-end circuit comprises a voltage-based equalizer, the voltage-based equalizer circuit being configured to partially compensate for the distortions in the amplified input signal caused by the at least one previously received input signal, the time-based DFE circuit being configured to further compensate for the distortions in the amplified input signal caused by the at least one previously received input signals based on the feedback signal and the edge movement signals.

17. The receiver of claim 16, wherein the receiver forms part of one of a memory controller, a computer processing unit, a graphic processing unit or a memory device.

18. A method for time-based decision feedback equalization, the method comprising:
receiving from a channel an input signal having distortions caused by previously received input signals received from the channel;
shifting edges of multiple instances of the received input signal in time from initial edge time locations to new edge time locations over a time interval for detecting the input signal to generate time-edge shifted input signals, wherein each time-edge shifted input signal compensates for intersymbol interference (ISI) effects that a given previously received input signal has on the input signal; and combining the time-edge shifted input signals to provide a compensated signal, wherein the compensated signal is an edge-modulated version of the input signal that has been offset for the ISI effects.

19. The method of claim 18, further comprising:

receiving a feedback signal and edge movement signals, the feedback signal being generated based on the given previously received input signal that distorts a respective received input signal; and shifting the edges of the respective received input signal in time from the initial edge time locations to the new edge time locations over the time interval based on respective feedback signal and edge movement signals.

20. The method of claim 18, wherein the shifting further comprises:

applying one of a positive timing offset or a negative timing offset to a respective received input to one of advance or delay in time a rising edge of the respective received input signal from an initial rising edge time location to a new rising edge time location over the time interval, and one of one of advance or delay in time a falling edge of the respective received input signal from an initial falling edge time location to a new falling edge time location over the time interval, wherein the rising edge and the falling edge are advanced or delayed in time by a similar amount of time.

* * * * *